(12) United States Patent
Takeda et al.

(10) Patent No.: US 11,073,209 B2
(45) Date of Patent: Jul. 27, 2021

(54) CONNECTED PART SEAL STRUCTURE, AND SEAL MEMBER

(71) Applicant: CKD CORPORATION, Komaki (JP)

(72) Inventors: Hideyuki Takeda, Kasugai (JP); Hiroki Iwata, Kasugai (JP); Hiroto Yasue, Gifu (JP); Shinjiro Hariyama, Chita (JP)

(73) Assignee: CKD CORPORATION, Komaki (JP)

( * ) Notice: Subject to any disclaimer, the term of this patent is extended or adjusted under 35 U.S.C. 154(b) by 209 days.

(21) Appl. No.: 16/465,896

(22) PCT Filed: Oct. 25, 2017

(86) PCT No.: PCT/JP2017/038424
§ 371 (c)(1),
(2) Date: May 31, 2019

(87) PCT Pub. No.: WO2018/110094
PCT Pub. Date: Jun. 21, 2018

(65) Prior Publication Data
US 2019/0301608 A1    Oct. 3, 2019

(30) Foreign Application Priority Data

Dec. 13, 2016    (JP) .............................. JP2016-241524

(51) Int. Cl.
*F16J 15/10*    (2006.01)
*F16J 15/06*    (2006.01)
(Continued)

(52) U.S. Cl.
CPC ............. *F16J 15/062* (2013.01); *F16J 15/10* (2013.01); *F16J 15/3432* (2013.01); *F16L 47/065* (2013.01); *F16L 23/02* (2013.01)

(58) Field of Classification Search
CPC ........ F16J 15/062; F16J 15/10; F16J 15/3432; F16L 47/065; F16L 23/02
See application file for complete search history.

(56) References Cited

U.S. PATENT DOCUMENTS 5,466,018 A * 11/1995 Stobbart ............... F16L 23/167
285/334.2
7,581,764 B2 * 9/2009 Ishihara ................. F16J 15/062
285/331
(Continued)

FOREIGN PATENT DOCUMENTS

CN          101223389 A     7/2008
JP          2015-124863 A   7/2015
(Continued)

OTHER PUBLICATIONS

Jan. 16, 2018 International Search Report issued in International Application No. PCT/JP2017/038424.
(Continued)

*Primary Examiner* — Gilbert Y Lee
(74) *Attorney, Agent, or Firm* — Oliff PLC

(57) ABSTRACT

In a connected-part seal structure configured to couple a first connected part and a second connected part through a seal member, the taper angles of first and second inner pressure-contact tapered parts provided in the seal member are smaller than the taper angles of first and second inner tapered parts provided in the first and second connected parts. Thus, a pressure-contact force of first and second inside tapered pressure-contact allowances are larger as the inside tapered pressure-contact allowances are located closer to base end parts of first and second annular protrusions.

20 Claims, 25 Drawing Sheets

(51) Int. Cl.
    *F16J 15/34*    (2006.01)
    *F16L 47/06*    (2006.01)
    *F16L 23/02*    (2006.01)

(56) References Cited

U.S. PATENT DOCUMENTS

| | | | |
|---|---|---|---|
| 8,033,579 B2 * | 10/2011 | Takeda | F16L 23/06 285/367 |
| 2008/0000533 A1 | 1/2008 | Katsura | |
| 2009/0091125 A1 | 4/2009 | Takeda et al. | |
| 2020/0408305 A1 * | 12/2020 | Adachi | F16J 15/104 |

FOREIGN PATENT DOCUMENTS

| | | |
|---|---|---|
| KR | 10-2007-0043897 A | 4/2007 |
| KR | 10-2009-0035421 A | 4/2009 |

OTHER PUBLICATIONS

Jun. 18, 2019 International Preliminary Report on Patentability issued in International Application No. PCT/JP2017/038424.
Aug. 4, 2020 Office Action issued in Chinese Patent Application No. 201780076052.9.
Nov. 20, 2020 Office Action issued in Korean Patent Application No. 10-2019-7019029.

\* cited by examiner

CONNECTED PART SEAL STRUCTURE, AND SEAL MEMBER

TECHNICAL FIELD

The present invention relates to a connected-part seal structure for coupling a first connected part and a second connected part through a seal member, and the seal member.

BACKGROUND ART

Heretofore, a semiconductor manufacturing device has been configured such that a seal member is placed in a connecting section between pipes and components of fluid control devices to prevent outward leakage of a fluid. For example, connected-part seal structures disclosed in Patent Documents 1 and 2 are each configured such that a connection end face of a pipe is formed with an annular protrusion and a tapered surface while a seal member is formed with an annular groove and a tapered surface so that the annular protrusion is press-fitted in the annular groove to bring the tapered surfaces into pressure contact with each other. Further, in the connected-part seal structure disclosed in Patent Document 1, the taper angle of the tapered surface of the connection end face is set larger than the taper angle of the tapered surface of the seal member so that a pressure-contact allowance of the tapered surfaces is larger at a position closer to a passage wall surface apart from a base end part of the annular protrusion.

RELATED ART DOCUMENTS

Patent Documents

Patent Document 1: Japanese Patent No. 4465254
Patent Document 2: Japanese Patent No. 5134573

SUMMARY OF INVENTION

Problems to be Solved by the Invention

However, the connected-part seal structures disclosed in Patent Documents 1 and 2 are problematic in the following respects. Specifically, in the connected-part seal structure in Patent Document 1, the pressure-contact allowance of the tapered surfaces is larger at a position closer to the passage wall surface apart from the base end part of the annular protrusion. In the connected-part seal structure in Patent Document 1, therefore, a large pressure-contact force could be applied to a part of the connection end face near the thin passage wall, thereby causing the passage wall surface to bend or warp toward the center of the flow passage. In this case, the connected-part seal structure in Patent Document 1 may cause narrowing of the flow passage and decreasing of the sealing strength between the tapered surfaces. Further, Patent Document 2 discloses that the annular protrusion is press-fitted in the annular groove to make the tapered surfaces contact with each other; however, Patent Document 2 mentions neither their taper shapes nor resultant problems.

The invention has been made to solve the above problems and has a purpose to provide a connected-part seal structure and a seal member to achieve high sealing performance while preventing deformation of a flow passage.

Means of Solving the Problems

To achieve the above purpose, one aspect of the invention provides (1) a connected-part seal structure configured to couple a first connected part and a second connected part through a seal member, wherein both or one of a connection end face of the first connected part and a connection end face of the second connected part includes: a passage wall including an open end that opens in the connection end face; an annular protrusion annularly extending along an outer periphery of the open end of the passage wall, the annular protrusion protruding in an axial direction of the passage wall; and an inner mounting groove provided inside the annular protrusion in a radial direction, and the seal member has an annular shape and includes an annular groove in both or one of end faces, in which the annular protrusion is press-fitted, wherein the inner mounting groove includes an inner tapered part provided inside a base end part of the annular protrusion in the radial direction and at a sharp angle to the annular protrusion, the inner tapered part being continuous with the passage wall, the seal member includes an inner peripheral surface including an inner pressure-contact tapered part formed along an end portion positioned close to the end face in which the annular groove opens, the inner pressure-contact tapered part being slanted corresponding to the inner tapered part, and the inner pressure-contact tapered part has a taper angle smaller than a taper angle of the inner tapered part.

In the connected-part seal structure configured as above, the taper angle of the inner pressure-contact tapered part provided in the seal member is set smaller than the taper angle of the inner tapered part provided in the connected part, so that the pressure-contact force in a sealing portion where the inner pressure-contact tapered part and the inner tapered part pressure-contact with each other is larger on the annular protrusion side and smaller on the flow passage side. Specifically, the pressure-contact force in the pressure-contact sealing portion of the inner pressure-contact tapered part and the inner tapered part is larger in a thick portion of the connected part and smaller in a thin portion of the same. Accordingly, when the first connected part and the second connected part are coupled through the seal member, a warped amount of a sharply-angled portion of the connected part provided between the inner tapered part and the passage wall is small. According to the connected-part seal structure configured as above, therefore, the connected part prevents the passage wall from greatly expanding inward in the radial direction due to repulsion force of the seal member. This can prevent or suppress the flow passage from narrowing. In addition, the surface pressure applied by the inner tapered part to the inner pressure-contact tapered part is generated in a direction toward a sealing portion between the annular protrusion and a pressure-contact allowance of the annular groove. Therefore, the sealing strength is enhanced in an inside tapered pressure-contact allowance which allows the inner tapered part and the inner pressure-contact tapered part to pressure-contact with each other and a seal pressure-contact allowance which allows the annular protrusion and the inner wall of the annular groove to pressure-contact with each other. Consequently, the connected-part seal structure configured as above can reliably prevent leakage of a fluid and achieve high sealing performance.

(2) In the configuration described in (1), preferably, the connection end face provided with the inner mounting groove includes an outer mounting groove located outside the annular protrusion in the radial direction, the seal member includes an outside pressure-contact allowance which pressure-contacts with an inner wall of the outer mounting groove outward in a radial direction, and the outside pressure-contact allowance is smaller than an inside tapered pressure-contact allowance which allows the inner pressure-contact tapered part to pressure-contact with the inner tapered part.

In the connected-part seal structure configured as above, the outside pressure-contact allowance is set smaller than the inside tapered pressure-contact allowance, so that the repulsion force of the seal member is reduced more than in a configuration for example that the outside pressure-contact allowance and the inside tapered pressure-contact allowance are set equal in size. According to the foregoing connected-part seal structure, therefore, when the first connected part and the second connected part are coupled through the seal member, the first connected part and the second connected part are prevented from deforming due to the repulsion force of the seal member, thereby enabling prevention of reduction in sealing strength.

(3) In the configuration described in (2), preferably, the outside pressure-contact allowance is located at a position closer to the base end part of the annular protrusion relative to a seal pressure-contact allowance which allows an inner wall of the annular groove to pressure-contact with the annular protrusion.

In the connected-part seal structure configured as above, the surface pressure applied from the inner wall of the outer mounting groove to the outside pressure-contact allowance is generated in a direction toward the seal pressure-contact allowance which allows pressure-contact between the annular protrusion and the inner wall of the annular groove. Thus, the sealing strength is enhanced. The connected-part seal structure configured as above can therefore reliably prevent leakage of a fluid and achieve high sealing performance.

(4) In the configuration described in (2) or (3), preferably, the outer mounting groove includes an outer tapered part provided outside the base end part of the annular protrusion in the radial direction and at a sharp angle to the annular protrusion.

In the connected-part seal structure configured as above, the outer tapered part allows the outside pressure-contact allowance to easily tilt toward the base end part of the annular protrusion. According to the connected-part seal structure configured as above, therefore, the surface pressure generated in the seal pressure-contact allowance increases, so that even when the outside pressure-contact allowance is set smaller than the inside tapered pressure-contact allowance, the sealing strength is enhanced, thereby enabling reliable prevention of fluid leakage.

(5) In the configuration described in one of (2) to (4), preferably, the seal member includes an outer peripheral surface including an outer pressure-contact tapered part formed along the end portion positioned close to the end face in which the annular groove opens.

In the connected-part seal structure configured as above, the outer pressure-contact tapered part allows the outside pressure-contact allowance to easily further tilt toward the base end part of the annular protrusion. According to the connected-part seal structure configured as above, therefore, the surface pressure generated in the seal pressure-contact allowance increases. Thus, even when the outside pressure-contact allowance is set smaller than the inside tapered pressure-contact allowance, the sealing strength is enhanced, thereby enabling reliable prevention of fluid leakage.

(6) In the configuration described in one of (2) to (5), preferably, the seal member includes an outer peripheral surface located outside in the radial direction, the outer peripheral surface including a surface placed near a surface of the mounting groove in the axial direction.

In the connected-part seal structure configured as above, for instance, assuming that attaching and detaching of the annular groove and the annular protrusion are repeated excessively or the first and second connected parts and the seal member are subjected to abnormal temperature changes, even if the pressure-contact force of the outside pressure-contact allowance decreases, the outer peripheral surface of the seal member and the surface of the outer mounting groove in the axial direction contact with each other, thereby suppressing deformation of the seal member. At that time, the outside pressure-contact allowance is assisted to be pressurized toward the annular protrusion. The connected-part seal structure configured as above can enhance the sealing strength as in an initial state or during temperature changes in a normal state.

(7) The configuration described in one of (1) to (6), preferably, further includes a clamp member configured to fix the first connected part and the second connected part between which the seal member is interposed, wherein the first connected part and the second connected part each have a flange shape formed with a clamp groove in which the clamp member is mounted, the connection end face of the first connected part and the connection end face of the second connected part have the same shape as each other, and the both end faces of the seal member have the same shape as each other.

In the connected-part seal structure configured as above, the first and second connected parts are each provided with the clamp groove, thus taking a flange shape, resulting in low rigidity. However, the repulsion force of the seal member is decreased. Accordingly, the first connected part and the second connected part are prevented from deforming, or warping back, when they are coupled together through the seal member. The connected-part seal structure configured as above therefore does not need to increase the wall thickness of the first and second connected parts and the clamp member to enhance the rigidity. Thus, compactness can be achieved.

(8) Another aspect provides a seal member to be used in the connected-part seal structure described in one of (1) to (7). According to the seal member configured as above, the repulsion force is suppressed when the seal member is placed between the first second and the second connected part. This seal member can therefore achieve high sealing performance while suppressing deformation of a flow passage formed in the first and second connected parts.

Effects of the Invention

Accordingly, the present invention can provide a connected-part seal structure and a seal member configured to provide high sealing performance while suppressing deformation of a flow passage.

MODE FOR CARRYING OUT THE INVENTION

A detailed description of preferred embodiments of a connected-part seal structure and a seal member embodying the present invention will now be given referring to the accompanying drawings.

First Embodiment

<Structure of Connected-Part Seal Structure>

Figure 1:
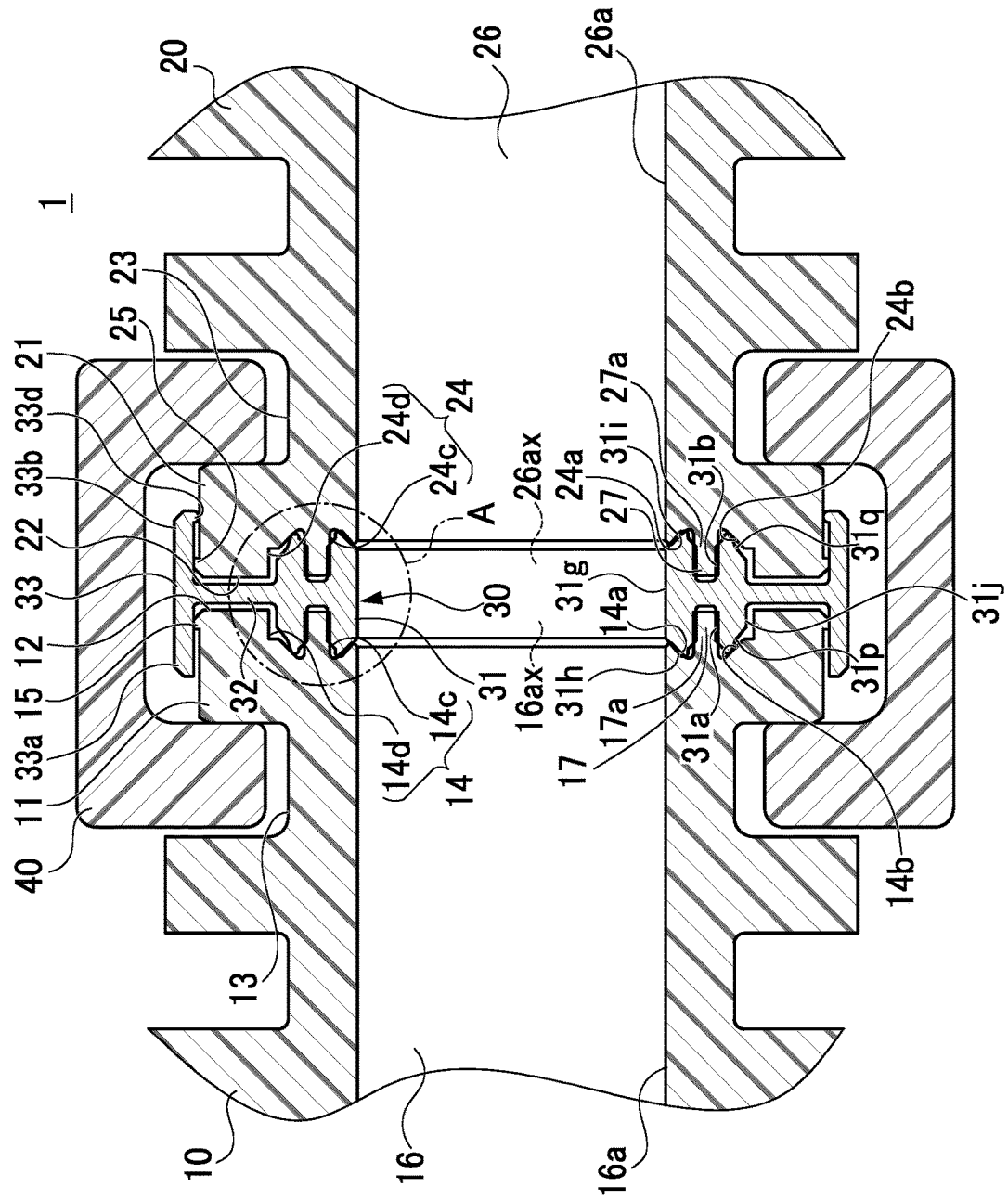
FIG. 1 is a cross-sectional view of a connected-part seal structure in a first embodiment of the present invention.

FIG. 1 is a cross-sectional view of a connected-part seal structure 1 in a first embodiment of the present invention.

Figure 2:
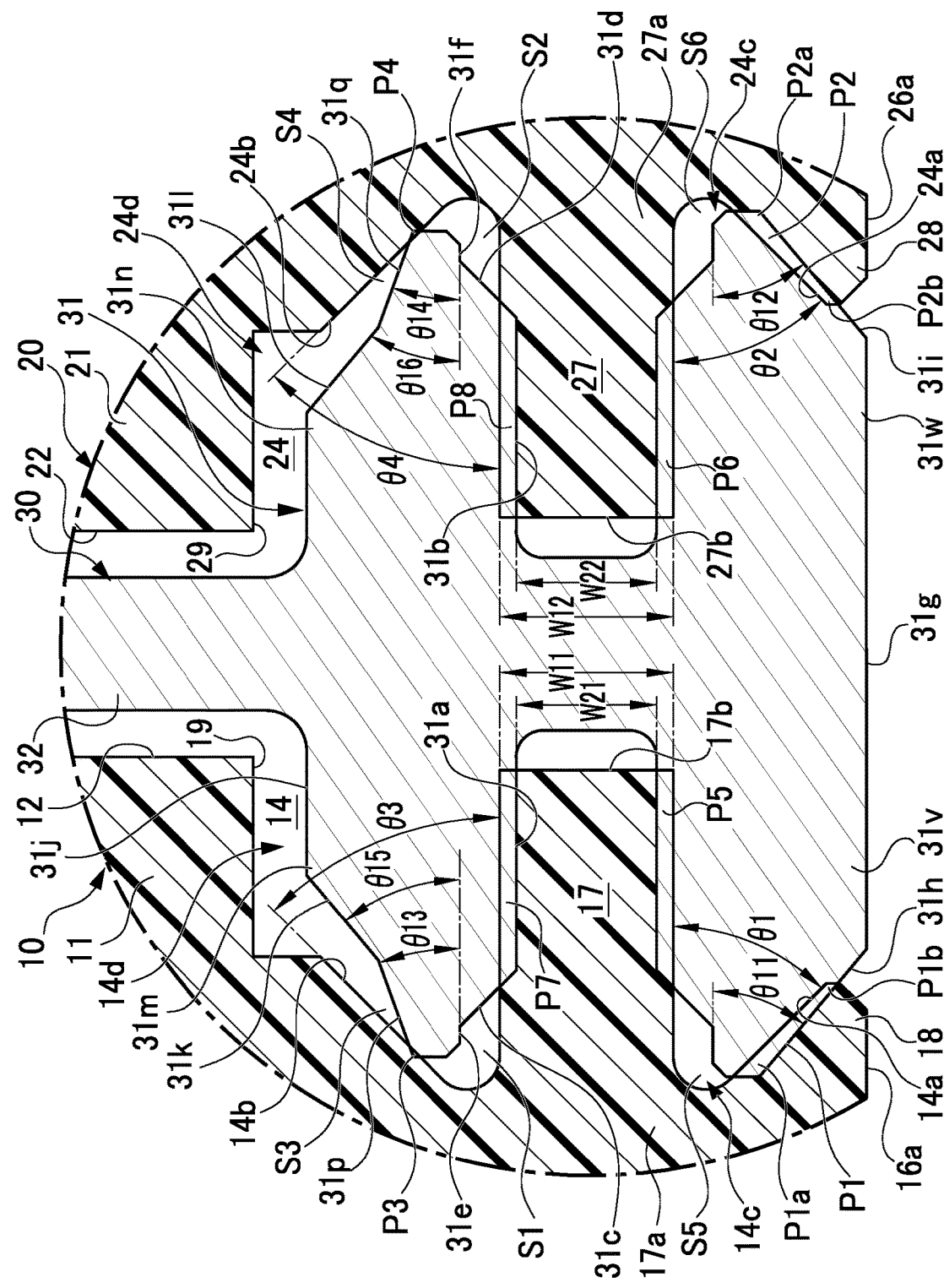
FIG. 2 is an enlarged view of a section A in FIG. 1.

FIG. 2 is an enlarged view of a section A in FIG. 1. A first inside tapered pressure-contact allowance P1 and a second inside tapered pressure-contact allowance P2, a first outside pressure-contact allowance P3 and a second outside pressure-contact allowance P4, a first inside seal pressure-contact allowance P5 and a second inside seal pressure-contact allowance P6, and a first outside seal pressure-contact allowance P7 and a second outside seal pressure-contact allowance P8 in FIG. 2 are actually collapsed, or compressed. A first pipe 10, a second pipe 20, and a seal ring 30 are made of fluorine resin; however, FIGS. 1 and 2 illustrate the seal ring 30 with hatching lines different from the hatching lines of the first pipe 10 and the second pipe 20 to facilitate visualization.

As shown in FIG. 1, the connected-part seal structure 1 is used for example in a joining section between the first pipe 10 and the second pipe 20 through which a gas for use in a semiconductor manufacturing device is allowed to flow. The first pipe 10 and the second pipe 20 are held in a connected state in a manner that a first connection end face 12 of a first connected part 11 and a second connection end face 22 of a second connected part 21 are butt-joined with each other by interposing a seal ring 30 therebetween, and a clamp member 40 is attached around the outer periphery of the first and second connected parts 11 and 21.

The first and second pipes 10 and 20, the seal ring 30, and the clamp member 40 are made of resin materials having similar linear expansion coefficients to each other. Thus, in the case of for example alternately flowing a chemical solution at high temperature exceeding 200° C. and a cleaning liquid at room temperature into the first pipe 10 and the second pipe 20, the first and second connected parts 11 and 21, the seal ring 30, and the clamp member 40 can expand or contract at a similar degree to one another to maintain the sealing performance. Specifically, the first and second pipes 10 and 20 are made of fluorine resin with good corrosion resistance and high strength, such as PTFE. The resin materials forming the first and second pipes 10 and 20 may be the same or different. The seal ring 30 is made of fluorine resin with good corrosion resistance, such as PFA. On the other hand, the clamp member 40 is made of fluorine resin resistant to corrosion and higher in strength than the first and second connected parts 11 and 21 in order to keep the connection state of the first and second connected parts 11 and 21 against the repulsion force of the seal ring 30.

<Structure of First Connected Part and Second Connected Part>

As shown in FIG. 1, the first and second connected parts 11 and 21 have the same shape. The first and second connected parts 11 and 21 are respectively formed with first and second clamp grooves 13 and 23 circumferentially extending along the outer peripheral surfaces of the first and second connected parts 11 and 21 to mount the clamp member 40 therein. Thus, the first and second connected parts 11 and 21 are each provided in a flange shape. That is, the first and second connected parts 11 and 21 are thin in wall thickness at each outer edge section between the first connection end face 12 and the first clamp groove 13 and between the second connection end face 22 and the second clamp groove 23.

As shown in FIG. 2, a first flow passage 16 has a first passage wall 16a that opens in the first connection end face 12. The first connection end face 12 is formed with a first mounting groove 14 annularly extending along the outer periphery of an open end 16ax of the first passage wall 16a. The first mounting groove 14 is formed, on a bottom wall, with a first annular protrusion 17 annularly extending along the outer periphery of the open end 16ax of the first passage wall 16a. The first annular protrusion 17 protrudes in an axial direction of the first passage wall 16a. Thus, the first mounting groove 14 includes a first inner mounting groove 14c provided inside the first annular protrusion 17 in a radial direction thereof and a first outer mounting groove 14d provided outside the first annular protrusion 17 in the radial direction.

The first inner mounting groove 14c includes a first inner tapered part 14a inside a base end part 17a of the first annular protrusion 17 in the radial direction. The first inner tapered part 14a is provided at a sharp angle to the first annular protrusion 17 to generate a surface pressure F1 (see FIG. 8) that presses a seal body 31 of the seal ring 30 toward the first annular protrusion 17. The first inner tapered part 14a is continuous with the first passage wall 16a. Therefore, the first connected part 11 is provided with a first support portion 18 along the first passage wall 16a to support the seal body 31 of the seal ring 30. The first support portion 18 has a triangular cross-sectional shape in the axial direction and is thicker in wall thickness at a position closer to the base end part 17a of the first annular protrusion 17 than in wall thickness at a position closer to a leading end part 17b of the first annular protrusion 17.

The first outer mounting groove 14d includes a first outer tapered part 14b outside the base end part 17a of the first annular protrusion 17 in the radial direction. Specifically, the first outer tapered part 14b is provided in a wall surface 19 extending in an axial direction of the passage wall and being located on the outside of the first outer mounting groove 14d in the radial direction, that is, in a section (i.e., a section located on the left side of the first mounting groove 14 in FIG. 2) located behind, or opposite, the opening of the first mounting groove 14 (the opening located on the right side of the first mounting groove 14 in FIG. 2) in the axial direction of the flow passage. The first outer tapered part 14b is provided at a sharp angle to the first annular protrusion 17 and generates a surface pressure F2 (see FIG. 8) to press the seal body 31 of the seal ring 30 toward the first annular protrusion 17.

The second connection end face 22 is provided with a second passage wall 26a, a second mounting groove 24, a second inner tapered part 24a, a second outer tapered part 24b, a second inner mounting groove 24c, a second outer mounting groove 24d, a second annular protrusion 27, and a second support portion 28 as with the first passage wall 16a, the first mounting groove 14, the first inner tapered part 14a, the first outer tapered part 14b, the first inner mounting groove 14c, the first outer mounting groove 14d, the first annular protrusion 17, and the first support portion 18 each provided in the first connection end face 12. The second connection end face 22 thus has the same shape as the first connection end face 12 and the explanation thereof is not elaborated upon.

<Structure of Seal Member>

Figure 3:
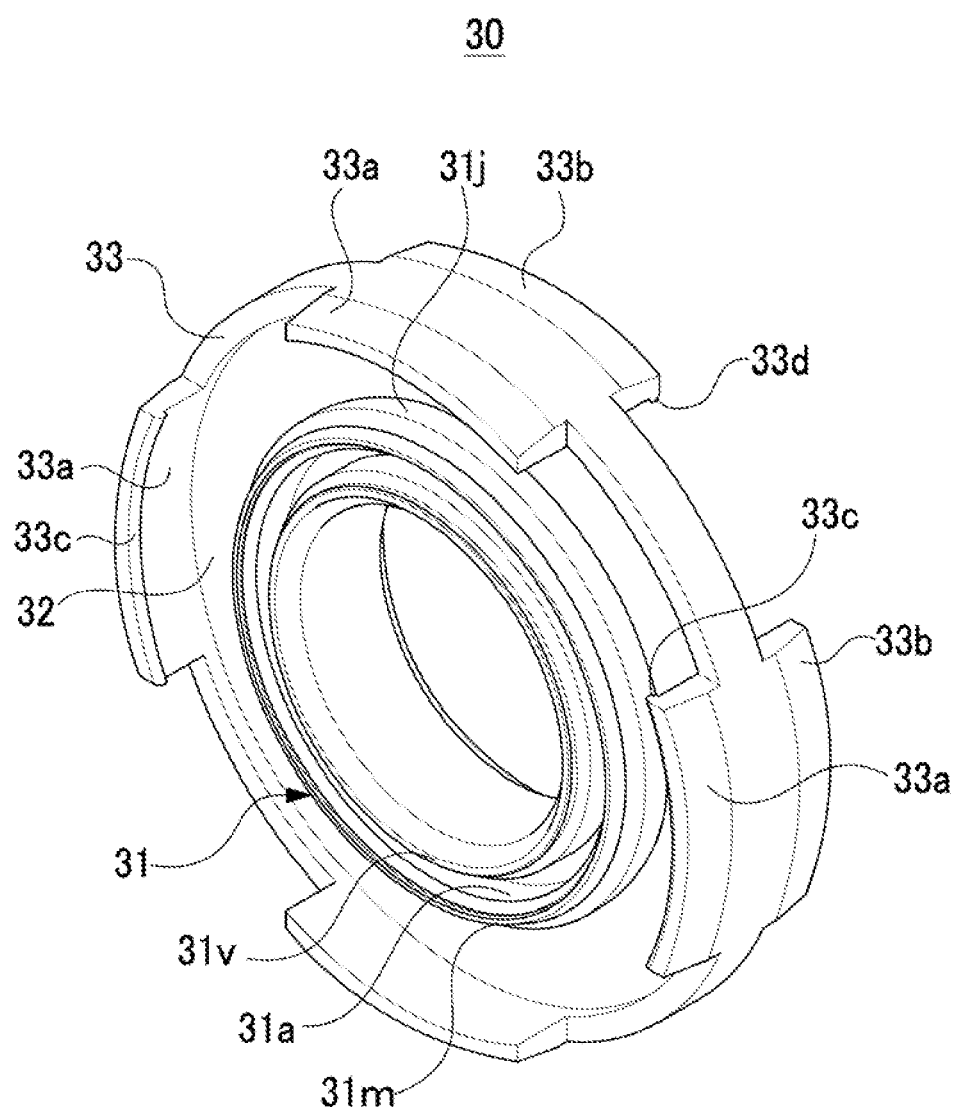
FIG. 3 is a front-side perspective view of a seal ring in the first embodiment of the present invention.
Figure 4:
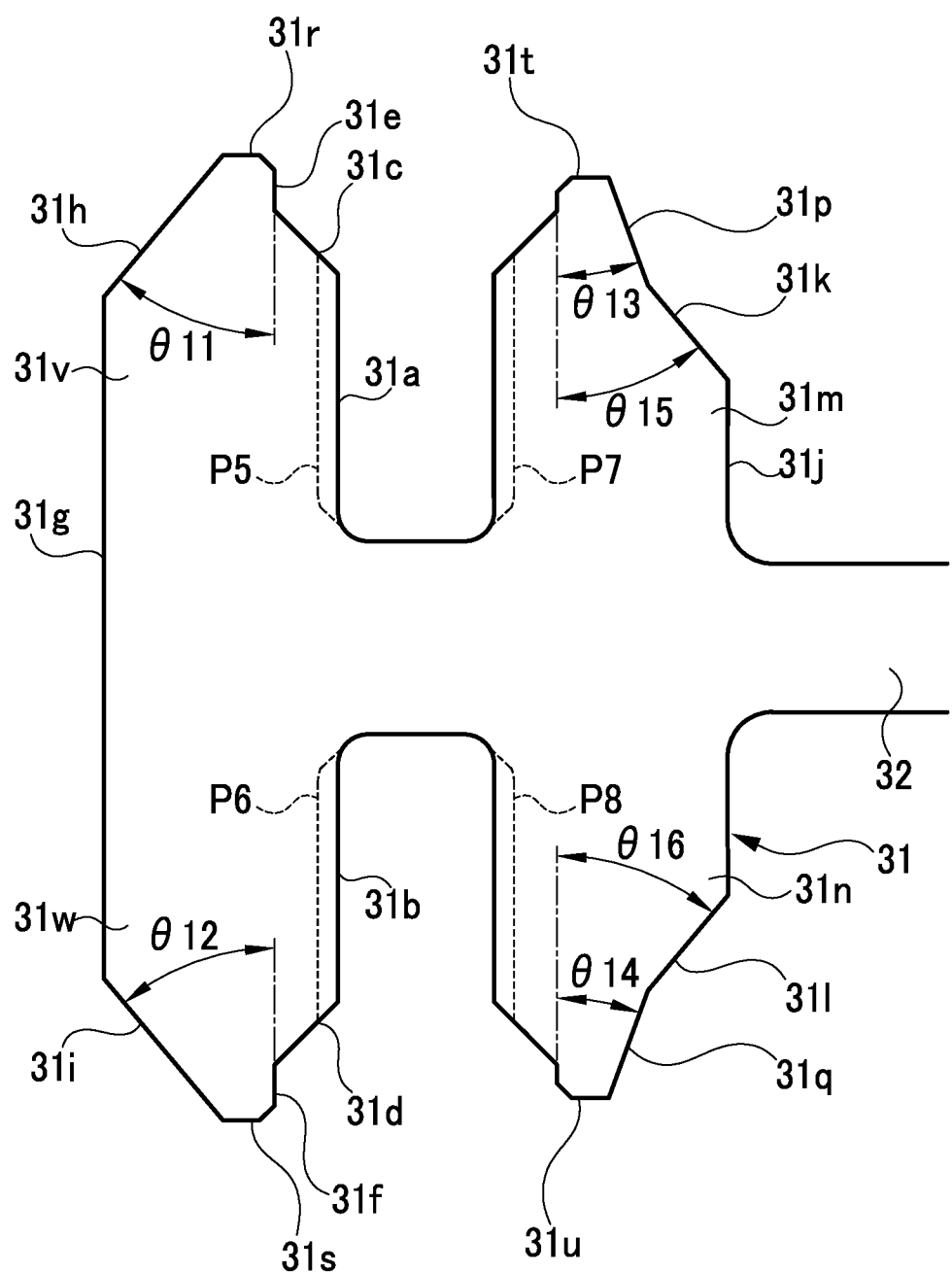
FIG. 4 is an enlarged cross-sectional view of a seal body and its surroundings of a seal ring shown in FIG. 3.

FIG. 3 is a front-side perspective view of the seal ring 30 in the first embodiment of the present invention. FIG. 4 is an enlarged cross-sectional view of the seal body 31 and its surroundings in the seal ring 30 shown in FIG. 3. In FIG. 4, for easy visualization, they are depicted with only a cross-sectional profile without hatching lines.

The seal ring 30 shown in FIG. 3 is made by injection molding. The seal ring 30 includes the seal body 31 having a ring shape, a web part 32 extending radially outward from the outer peripheral surface of the seal body 31, and a retaining part 33 provided along the outer peripheral edge of the web part 32. The seal body 31 is one example of a seal member.

Figure 5:
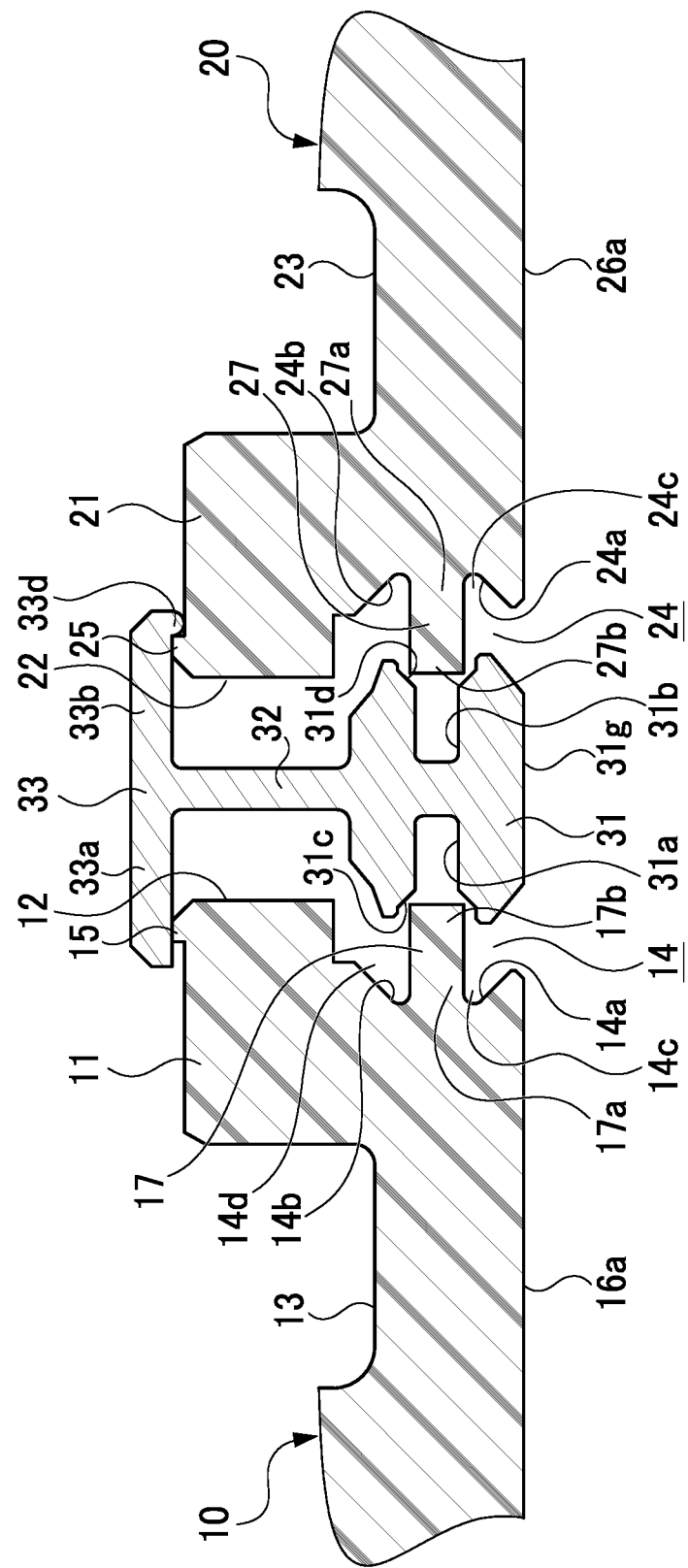
FIG. 5 is an explanatory view for a method of coupling a first and a second connected parts, illustrating a temporarily joining state.

The retaining part 33 is placed outside the first and second connected parts 11 and 21 as shown in FIG. 5. As shown in FIG. 3, the retaining part 33 includes extended parts 33a and 33b provided with locking portions 33c and 33d which are respectively engageable with protrusions 15 and 25 of the first and second connected parts 11 and 21.

The seal ring 30 is designed with an inner diameter about the same as an inner diameter of the first and second passage walls 16a and 26a as shown in FIG. 2, so that an inner peripheral surface 31g defines a flow passage in combination with the first and second passage walls 16a and 26a.

As shown in FIGS. 2 and 4, the seal body 31 is mounted in the first and second mounting grooves 14 and 24 of the first and second connected parts 11 and 21. The seal body 31 has an H-shaped cross-sectional shape in the axial direction. Specifically, the seal body 31 is formed with a first annular groove 31a on one of end faces in the axial direction and a second annular groove 31b on the other end face in the axial direction. Accordingly, the seal body 31 is provided with a first inside annular wall 31v inside the first annular groove 31a in the radial direction and a first outside annular wall 31m outside the first annular groove 31a in the radial direction. Furthermore, the seal body 31 is provided with a second inside annular wall 31w inside the second annular groove 31b in the radial direction and a second outside annular wall 31n outside the second annular groove 31b in the radial direction.

As shown in FIG. 2, the first annular groove 31a is designed with a width W21 in the radial direction smaller than a width W11 of the first annular protrusion 17 in the radial direction. Thus, the first annular groove 31a is provided with a first inside seal pressure-contact allowance P5 in an inner peripheral surface located inside in the radial direction, and a first outside seal pressure-contact allowance P7 in an inner peripheral surface located outside in the radial direction. The second annular groove 31b is designed with a width W22 in the radial direction smaller than a width W12 of the second annular protrusion 27 in the radial direction. Thus, the second annular groove 31b is provided with a second inside seal pressure-contact allowance P6 in an inner peripheral surface located inside in the radial direction, and a second outside seal pressure-contact allowance P8 in an inner peripheral surface located outside in the radial direction. In other words, the seal body 31 is provided with the first and second inside seal pressure-contact allowances P5 and P6 that respectively allow the first and second inside annular walls 31v and 31w to come into pressure-contact with and seal against the first and second annular protrusions 17 and 27 and the first and second outside seal pressure-contact allowances P7 and P8 that respectively allow the first and second annular walls 31m and 31n to come into pressure-contact with and seal against the first and second annular protrusions 17 and 27.

As shown in FIGS. 2 and 4, the first annular groove 31a is formed, at its opening, with a tapered, first positioning part 31c configured to guide and position the first annular protrusion 17 into the first annular groove 31a. The first positioning part 31c is provided, at an inlet, with a first large-diameter part 31e designed with a larger width in the radial direction than the width of the first annular protrusion 17 in the radial direction. This first large-diameter part 31e allows a gap S5 to be formed between the first inside annular wall 31v and the base end part 17a of the first annular protrusion 17 and a gap S1 to be formed between the first outside annular wall 31m and the base end part 17a of the first annular protrusion 17 as shown in FIG. 2. In the course of and after drawing together the first and second connected parts 11 and 21, the gaps S5 and S1 respectively permit the first inside annular wall 31v and the first outside annular wall 31m to deform toward the first annular protrusion 17, thereby absorbing the repulsion force of the seal body 31.

Moreover, as shown in FIGS. 2 and 4, the second annular groove 31b is formed, at its opening, with a second positioning part 31d and a second large-diameter part 31f as with the first positioning part 31c and the first large-diameter part 31e of the first annular groove 31a. This second large-diameter part 31f allows a gap S6 to be formed between the second inside annular wall 31w and the base end part 27a of the second annular protrusion 27 and a gap S2 to be formed between the second outside annular wall 31n and the base end part 27a of the second annular protrusion 27 as shown in FIG. 2. Those gaps S2 and S6 absorb the repulsion force generated in the course of and after drawing together the first and second connected parts 11 and 21.

The inner peripheral surface 31g of the seal body 31 is formed with a first inner pressure-contact tapered part 31h along an and close to the end face in which the first annular groove 31a opens. The inner peripheral surface 31g is further formed with a second inner pressure-contact tapered part 31i along an end close to the end face in which the second annular groove 31b opens.

As shown in FIGS. 2 and 4, the first inner pressure-contact tapered part 31h is slanted corresponding to the first inner tapered part 14a and thus presses against and contacts with the first inner tapered part 14a. As shown in FIG. 2, the first inner pressure-contact tapered part 31h is designed with a taper angle θ11 smaller than a taper angle θ1 of the first inner tapered part 14a. Herein, the θ11 denotes an angle formed between the inner peripheral surface of the first large-diameter part 31e located inside in the radial direction and the first inner pressure-contact tapered part 31h and the taper angle θ1 indicates an angle formed between the inner peripheral surface of the first annular protrusion 17 located inside in the radial direction and the first inner tapered part 14a. Specifically, the first inside tapered pressure-contact allowance P1 which allows the first inner pressure-contact tapered part 31h to pressure-contact with the first inner tapered part 14a is provided such that a part P1a located on a leading end side of the first inside annular wall 31v is larger than a part P1b located on a base end side of the first inside annular wall 31v. That is, the pressure-contact force F5 (see FIG. 8) of the first inside tapered pressure-contact allowance P1 is larger as closer to the base end part 17a of the first annular protrusion 17. The first support portion 18 is thicker in wall thickness and higher in rigidity toward the base end part 17a. Thus, a rigid part of the first support portion 18 corresponds to a part of the first inside tapered pressure-contact allowance P1, which generates the larger pressure-contact force F5, so that the first support portion 18 is less likely to be deformed by the pressure-contact force F5.

On the other hand, as shown in FIGS. 2 and 4, the second inner pressure-contact tapered part 31i is slanted corresponding to the second inner tapered part 24a and thus presses against and contacts with the second inner tapered part 24a. As shown in FIG. 2, the second inner pressure-contact tapered part 31i is designed with a taper angle θ12 smaller than a taper angle θ2 of the second inner tapered part 24. Herein, the taper angle θ12 denotes an angle formed between the inner peripheral surface of the second large-diameter part 31f located inside in the radial direction and the second inner pressure-contact tapered part 31i and the taper angle θ2 indicates an angle formed between the inner peripheral surface of the second annular protrusion 27 located inside in the radial direction and the second inner tapered part 24a. Specifically, the second inside tapered pressure-contact allowance P2 which allows the second inner pressure-contact tapered part 31i to pressure-contact with the second inner tapered part 24a is provided such that a part P2a located on a leading end side of the second inside annular wall 31w is larger than a part P2b located on a base end side of the second inside annular wall 31w. That is, the pressure-contact force F5 (see FIG. 8) of the second inside tapered pressure-contact allowance P2 is larger as closer to the base end part 27a of the second annular protrusion 27. The second support portion 28 is thicker in wall thickness and higher in rigidity toward the base end part 27a. Thus, a rigid part of the second support portion 28 corresponds to a part of the second inside tapered pressure-contact allowance P2, which generates the larger pressure-contact force F5, so that the second support portion 28 is less likely to be deformed by the pressure-contact force F5.

On the other hand, the outer peripheral surface 31j of the seal body 31 is formed with a first outer pressure-contact tapered part 31p along an end located close to the end face in which the first annular groove 31a opens. Further, the outer peripheral surface 31j is formed with a second outer pressure-contact tapered part 31q along an end located close to the end face in which the second annular groove 31b opens.

As shown in FIGS. 2 and 4, the first outer pressure-contact tapered part 31p is provided with a first outside pressure-contact allowance P3 which radially outward pressure-contacts with the outer peripheral surface of the first outer mounting groove 14d located outside in the radial direction in the first connected part 11. A taper angle θ13 of the first outer pressure-contact tapered part 31p is smaller than a taper angle θ3 of the first outer tapered part 14b. Herein, the taper angle θ13 denotes an angle formed between the outside inner wall of the first large-diameter part 31e located outside in the radial direction and the first outer pressure-contact tapered part 31p and the taper angle θ13 indicates an angle formed between the outer peripheral surface of the first annular protrusion 17 located outside in the radial direction and the first outer tapered part 14b. Thus, the pressure-contact force F6 (see FIG. 8) of the first outside pressure-contact allowance P3 is larger as closer to the base end part 17a of the first annular protrusion 17. The first connected part 11 provides high rigidity near the base end part 17a. Accordingly, a rigid part of the first connected part 11 corresponds to a part of the first outside pressure-contact allowance P3, which generates the large pressure-contact force F6. In addition, the first outside annular wall 31m attempts to deform so as to bend or warp its leading end part outward in the radial direction. Thus, the seal body 31 can maintain the sealing strength while reducing the pressure-contact force F6.

The taper angle θ13 of the first outer pressure-contact tapered part 31p is set smaller than the taper angle θ11 of the first inner pressure-contact tapered part 31h. Accordingly, a gap S3 is formed between the first outer pressure-contact tapered part 31p and the first outer tapered part 14b to absorb deformation of the first outside annular wall 31m. Further, a leading end face 31t of the first outside annular wall 31m is provided to be closer to the bottom of the first annular groove 31a relative to a leading end face 31r of the first inside annular wall 31v. In the seal body 31, therefore, the contact area between the first outer pressure-contact tapered part 31p and the first outer tapered part 14b is smaller than the contact area between the first inner pressure-contact tapered part 31$h$ and the first inner tapered part 14$a$. Thus, the pressure-contact force F6 of the first outside pressure-contact allowance P3 is smaller than the pressure-contact force F5 of the first inside tapered pressure-contact allowance P1.

The first outer pressure-contact tapered part 31$p$ and the outer peripheral surface 31$j$ are continuous with each other through a first slant part 31$k$. The first slant part 31$k$ is provided at a taper angle θ15 larger than the taper angle θ13 of the first outer pressure-contact tapered part 31$p$, thereby enhancing the rigidity of the first outside annular wall 31$m$.

As shown in FIGS. 2 and 4, the second outer pressure-contact tapered part 31$q$ is provided with a second outside pressure-contact allowance P4 which radially outward pressure-contacts with the outer peripheral surface of the second outer mounting groove 24$d$ located outside in the radial direction in the second connected part 21. A taper angle θ14 of the second outer pressure-contact tapered part 31$q$ is smaller than a taper angle θ4 of the second outer tapered part 24$b$. Herein, the taper angle θ14 denotes an angle formed between the outside inner wall of the second large-diameter part 31$f$ located outside in the radial direction and the second outer pressure-contact tapered part 31$q$ and the taper angle θ4 indicates an angle formed between the outer peripheral surface of the second annular protrusion 27 located outside in the radial direction and the second outer tapered part 24$b$. Thus, the pressure-contact force F6 (see FIG. 8) of the second outside pressure-contact allowance P4 is larger as closer to the base end part 27$a$ of the second annular protrusion 27. The second connected part 21 provides high rigidity near the base end part 27$a$. Accordingly, a rigid part of the second connected part 21 corresponds to a part of the second outside pressure-contact allowance P4, which generates the large pressure-contact force F6. In addition, the second outside annular wall 31$n$ attempts to deform so as to bend or warp its leading end part outward in the radial direction. Thus, the seal body 31 can maintain the sealing strength while reducing the pressure-contact force F6.

The taper angle θ14 of the second outer pressure-contact tapered part 31$q$ is set smaller than the taper angle θ12 of the second inner pressure-contact tapered part 31$i$. Accordingly, a gap S4 is formed between the second outer pressure-contact tapered part 31$q$ and the second outer tapered part 24$b$ to absorb deformation of the second outside annular wall 31$n$. Further, a leading end face 31$u$ of the second outside annular wall 31$n$ is provided to be closer to the bottom of the second annular groove 31$b$ relative to a leading end faced 31$s$ of the second inside annular wall 31$w$. In the seal body 31, therefore, the contact area between the second outer pressure-contact tapered part 31$q$ and the second outer tapered part 24$b$ is smaller than the contact area between the second inner pressure-contact tapered part 41$i$ and the second inner tapered part 24$a$. Thus, the pressure-contact force F6 of the second outside pressure-contact allowance P4 is smaller than the pressure-contact force F5 of the second inside tapered pressure-contact allowance P2.

The second outer pressure-contact tapered part 31$q$ and the outer peripheral surface 31$j$ are continuous with each other through a second slant part 31$l$. The second slant part 31$l$ is provided at a taper angle θ16 larger than the taper angle θ14 of the second outer pressure-contact tapered part 31$q$, thereby enhancing the rigidity of the second outside annular wall 31$n$.

<Method of Coupling First Connected Part and Second Connected Part>

Figure 6:
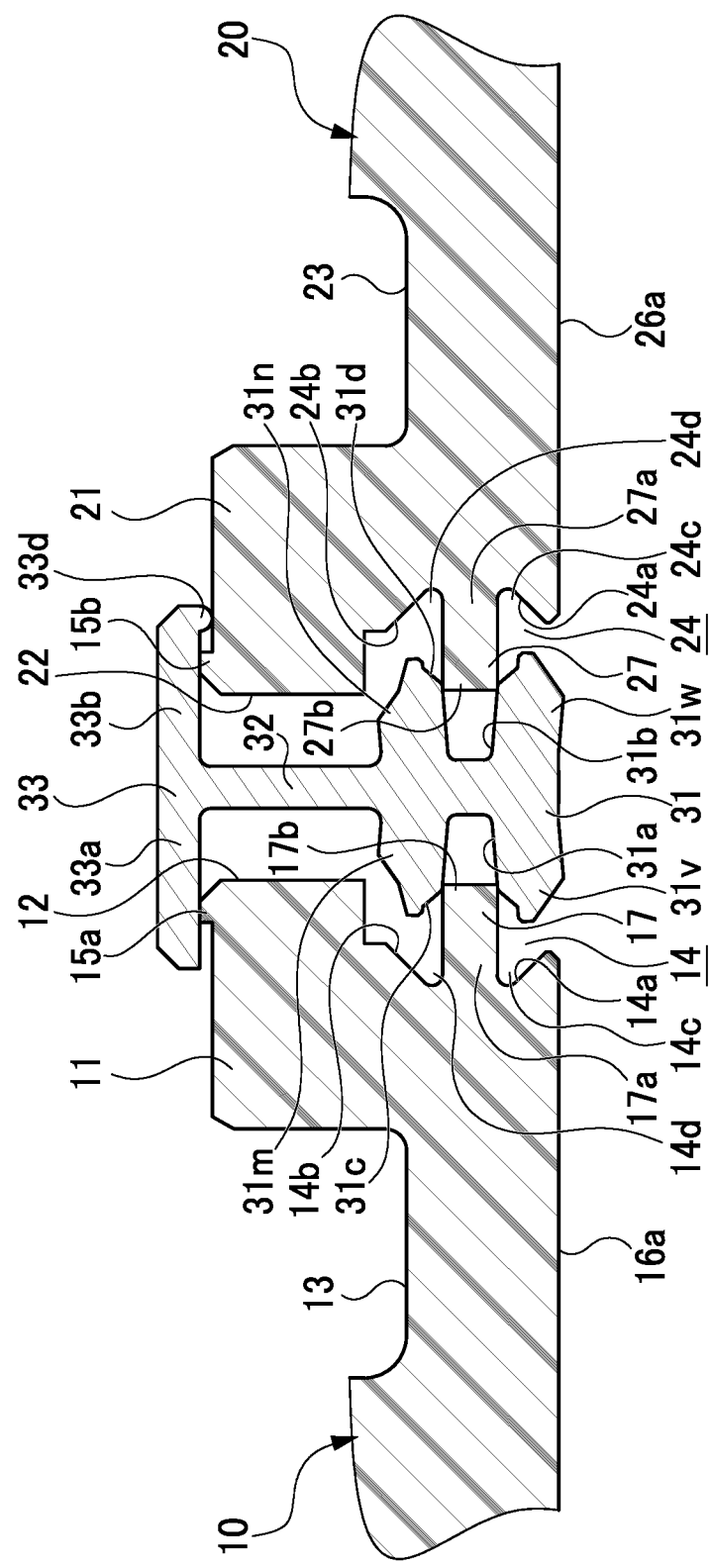
FIG. 6 is an explanatory view for the method of coupling the first and second connected parts, illustrating a press-fitting start state.
Figure 7:
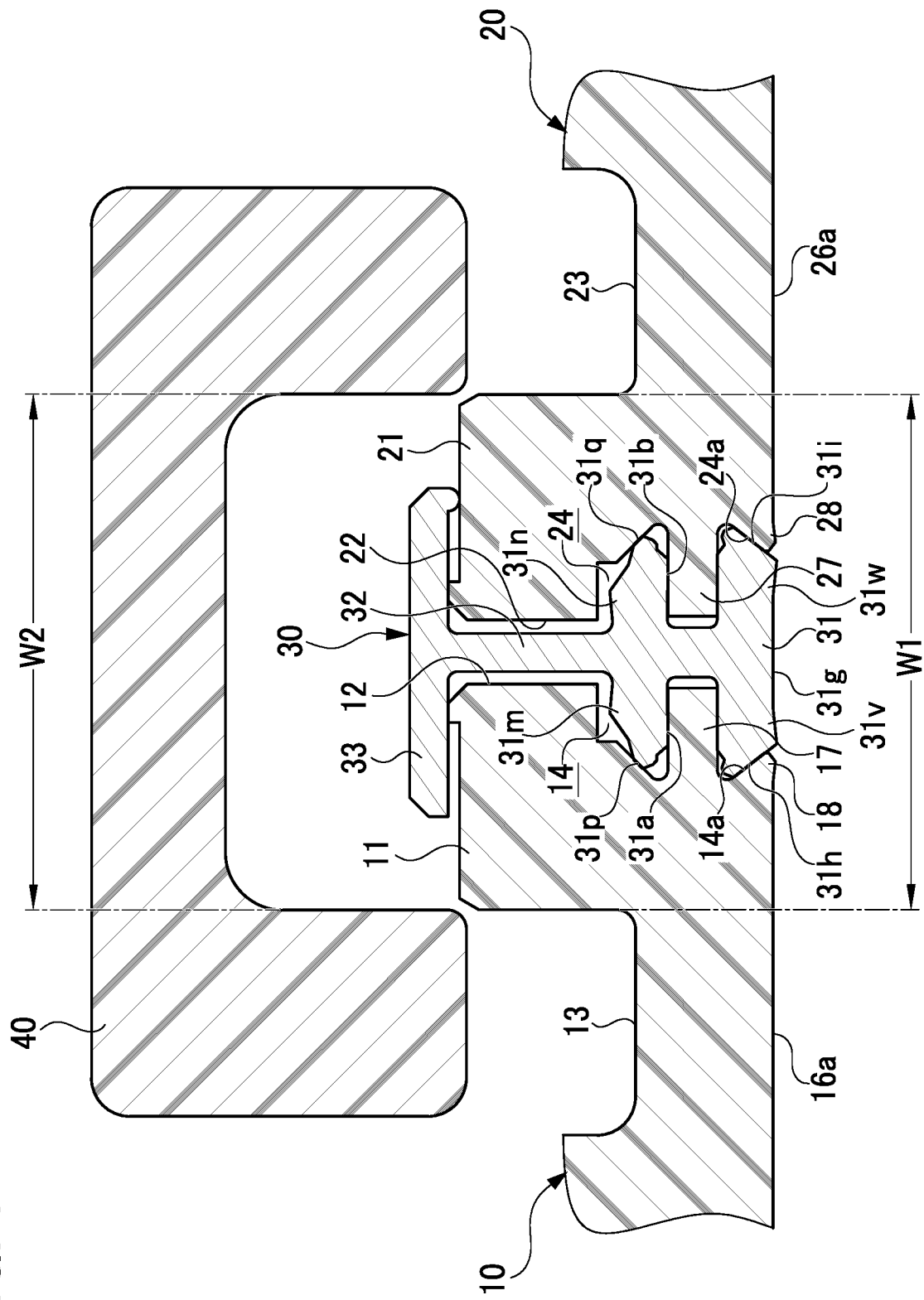
FIG. 7 is an explanatory view for the method of coupling the first and second connected parts, illustrating a press-fitting completion state.
Figure 8:
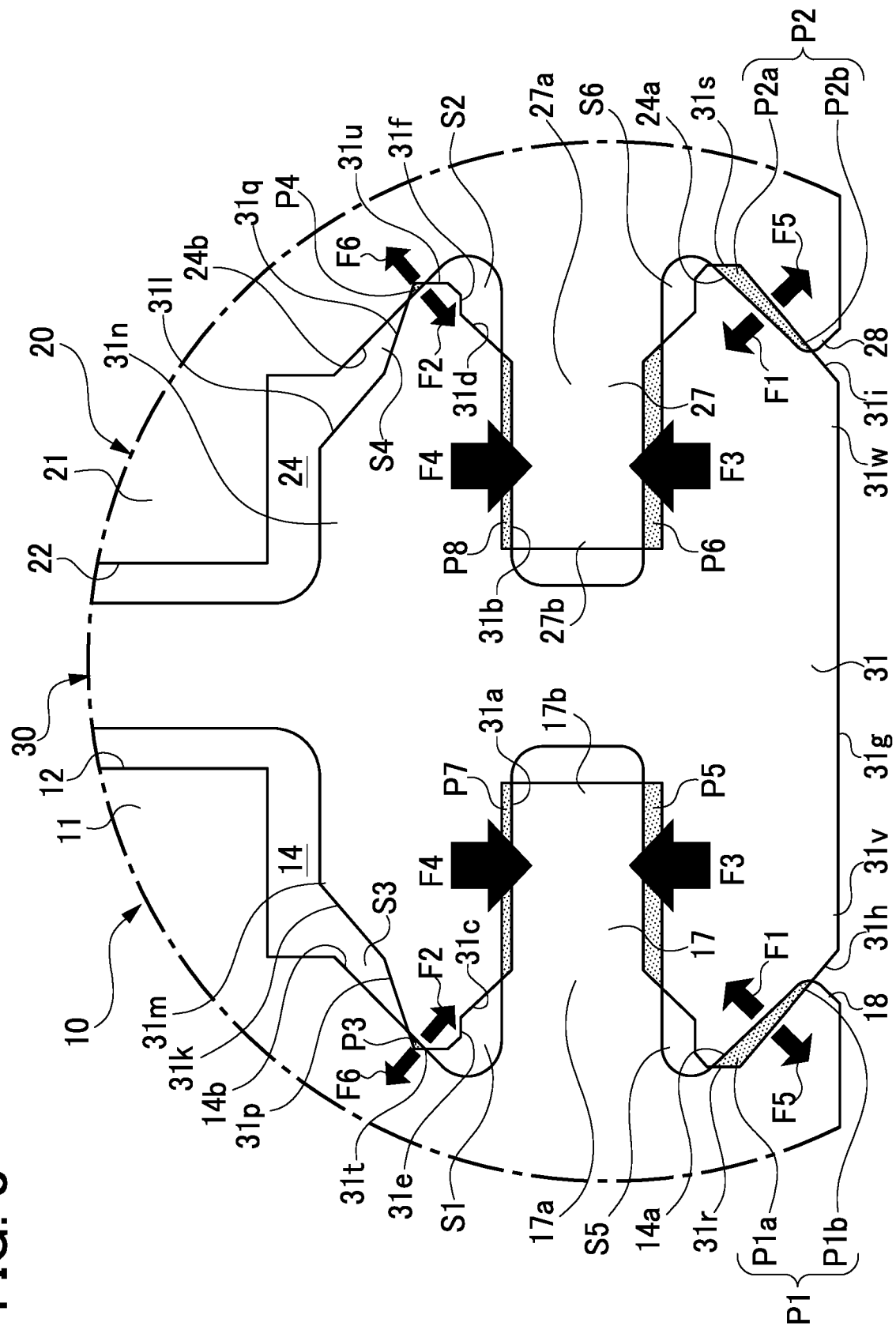
FIG. 8 is an explanatory view to show a relationship of forces generated in pressure contact allowances of the seal body.

A method of coupling the first connected part 11 and the second connected part 21 will be described below. FIGS. 5, 6, and 7 are explanatory views for the method of coupling the connected parts. FIG. 8 is an explanatory view to show a relationship of the forces generated in the pressure-contact allowances P1 to P8 of the seal body 31. In FIGS. 5 to 8, they are depicted with only a cross-sectional profile without hatching lines to facilitate visualization. Moreover, in FIGS. 5, 6, and 7, as with FIGS. 1 and 2, hatching lines of the seal ring 30 are different from the hatching lines of the first pipe 10 and the second pipe 20. In FIG. 8, no hatching line is depicted.

As shown in FIG. 5, the seal ring 30 is temporarily joined with the first connected part 11 and the second connected part 21 so as not to drop off therefrom in a manner that the locking portion 33$c$ is engaged with the protrusion 15 of the first connected part 11 and the locking portion 33$d$ is engaged with the protrusion 25 of the second connected part 21. In this state, the first and second annular protrusions 17 and 27 do not yet reach the first and second positioning parts 31$c$ and 31$d$.

Thereafter, for example, a jig not shown is engaged with the first and second clamp grooves 13 and 23 to apply a drawing load to the first and second connected parts 11 and 21 in a direction to move the first and second connection end faces 12 and 22 closer to each other. Thus, the first and second annular protrusion 17 and 27 are guided along an axial line into the first and second annular grooves 31$a$ and 31$b$ by the first and second positioning parts 31$c$ and 31$d$. As shown in FIG. 6, the leading end parts 17$b$ and 27$b$ start to be press-fitted in the first and second inside seal pressure-contact allowances P5 and P6 and the first and second outside seal pressure-contact allowance P7 and P8 of the seal body 31. The seal ring 30 thus attempts to deform such that the first and second annular grooves 31$a$ and 31$b$ are pressed and widened by the first and second annular protrusions 17 and 27, causing the first and second outside annular walls 31$m$ and 31$n$ to deform, or warp, opposite the first and second annular protrusions 17 and 27.

When the first and second connected parts 11 and 21 are continuously drawn together with the jig not shown, the first and second inner tapered parts 14$a$ and 24$a$ slide in contact with the first and second inner pressure-contact tapered parts 31$h$ and 31$i$ of the seal body 31 and the first and second outer tapered parts 14$b$ and 24$b$ slide in contact with the first and second outer pressure-contact tapered parts 31$p$ and 31$q$ of the seal body 31. Accordingly, the first and second inside annular walls 31$v$ and 31$w$ and the first and second outside annular walls 31$m$ and 31$n$ are suppressed from deforming due to the surface pressures applied from the first and second inner tapered parts 14$a$ and 24$a$ and the first and second outer tapered parts 14$b$ and 24$b$.

Upon completion of press-fit, as shown in FIG. 7, the inner walls of the first and second annular grooves 31$a$ and 31$b$ respectively seal the first and second annular protrusions 17 and 27, the first and second inner pressure-contact tapered parts 31$h$ and 31$i$ respectively seal the first and second inner tapered parts 14$a$ and 24$a$, and the first and second outer pressure-contact tapered parts 31$p$ and 31$q$ respectively seal the first and second outer tapered parts 14$b$ and 24$b$, so that the seal ring 30 can prevent leakage of a fluid from between the first and second connected parts 11 and 21.

Specifically, as shown in FIG. 8, the first and second inside seal pressure-contact allowances P5 and P6 of the seal ring 30 are respectively pressed into tight contact with the inner peripheral surfaces of the first and second annular protrusions 17 and 27 and the first and second outside seal pressure-contact allowances P7 and P8 are respectively pressed into tight contact with the outer peripheral surfaces of the first and second annular protrusions 17 and 27, thus generating sealing loads F3 and F4. Then, upon receiving the surface pressures F1 from the first and second inner tapered parts 14a and 24a in correspondence with the pressure-contact forces F5 of the first and the second inner pressure-contact tapered parts 31h and 31i, the seal ring 30 collapses, or compresses, the first and second inside tapered pressure-contact allowances P1 and P2 to provide sealing, thus contributing to an increase in the sealing load F3. Upon receiving the surface pressures F2 from the first and second outer tapered parts 14b and 24b in correspondence with the pressure-contact forces F6 of the first and second outer pressure-contact tapered parts 31p and 31q, furthermore, the seal ring 30 collapses, or compresses, the first and second outside pressure-contact allowances P3 and P4 to provide sealing, thus contributing to an increase in the sealing load F4.

In this case, since the taper angles θ11 and θ12 of the first and second inner pressure-contact tapered parts 31h and 31i are respectively smaller than the taper angles θ1 and θ2 of the first and second inner tapered parts 14a and 24a, each pressure-contact force F5 of the first and second inside tapered pressure-contact allowances P1 and P2 and each pressure-contact force F6 of the first and second outside pressure-contact allowances P3 and P4 are larger as closer to the base end part 17a of the first annular protrusion 17 or the base end part 27a of the second annular protrusion 27. The first and second connected parts 11 and 21 are thick in wall thickness near the base end parts 17a and 27a and high in strength and thus are unlikely to deform. In the connected-part seal structure 1, therefore, the first and second connected parts 11 and 21 are less likely to deform due to the pressure-contact forces F5 and F6 of the seal body 31.

Each of the first and second support portions 18 and 28 for supporting the inner peripheral surface 31g of the seal body 31 has a triangular cross-sectional shape in the axial direction and thus is low in strength. In the first and second inside tapered pressure-contact allowances P1 and P2, however, the pressure-contact force F5 is greater in a thicker section of each of the first and second support portions 18 and 28. In the connected-part seal structure 1, the first and second support portions 18 and 28 are thus prevented from deforming so as to expand toward the first and second flow passages 16 and 26 due to the pressure-contact forces F5. The connected-part seal structure 1 in the present embodiment can therefore avoid or prevent lowering of the sealing strength or narrowing of a flow passage due to deformation of the first and second support portions 18 and 28.

In addition, the seal body 31 receives the surface pressures F1 and F2 that are maximum at the leading ends, which are most deformable, of the first and second inside annular walls 31v and 31w and the leading ends, which are most deformable, of the first and the second outside annular walls 31m and 31n. These surface pressures act toward the first and second inside seal pressure-contact allowances P5 and P6 and the first and second outside seal pressure-contact allowances P7 and P8. In other words, the surface pressures act toward the portions of the first and second inside seal pressure-contact allowances P5 and P6 and the first and second outside seal pressure-contact allowances P7 and P8, the portions being near the first and second flow passages 26 and 26, that is, act toward portions near junctions between the first annular groove 31a and the first positioning part 31c and between the second annular groove 31b and the second positioning part 31d, thereby maintaining or increasing the sealing loads F3 and F4.

Furthermore, the seal body 31 is configured such that the first and second inside tapered pressure-contact allowances P1 and P2 are respectively located closer to the base end parts 17a and 27a relative to the first and second inside seal pressure-contact allowances P5 and P6 and the first and second outside pressure-contact allowances P3 and P4 are respectively located closer to the base end parts 17a and 27a relative to the first and second outside seal pressure-contact allowances P7 and P8. Thus, the acting directions of the surface pressures F1 and F2 are reliably directed toward the first and second inside seal pressure-contact allowances P5 and P6 and the first and second outside seal pressure-contact allowances P7 and P8.

In the connected-part seal structure 1, therefore, even when the pressure-contact forces F5 are reduced to such a degree that can prevent deformation of the first and second support portions 18 and 28, the sealing loads F3 acting on the inner periphery of the first and second annular protrusions 17 and 27 can be maintained or enhanced. Even when the pressure-contact forces F6 are reduced, similarly, the sealing loads acting on the outer periphery of the first and second annular protrusion 17 and 27 can be maintained or enhanced.

Consequently, the connected-part seal structure 1 in the present embodiment can reliably prevent leakage of a fluid and thus can keep high sealing performance.

To hold the first and second connected parts 11 and 21 as drawn together via the seal body 31 with the unillustrated jig, the clamp member 40 is attached to the first and second clamp grooves 13 and 23 of the first and second connected parts 11 and 21 as shown in FIG. 1.

As shown in FIG. 8, the first and second connected parts 11 and 21 each include a flange part along the first connection end face 12 or the second connection end face 22, radially outside the first and second annular protrusions 17 and 27, not radially inside the first and second annular protrusions 17 and 27. Accordingly, in the first and second connected parts 11 and 21, the flange parts are likely to be distorted by the pressure-contact forces F6 acting radially outward from the first and second outer pressure-contact tapered parts 31p and 31q to the first and second outer tapered parts 14b and 24b. Thus, if the first and second outside pressure-contact allowances are equal in dimension to the first and second inside tapered pressure-contact allowances, the first and second connection end faces 12 and 22 may be deformed so as to warp at their portions close to the outer peripheral surfaces.

In contrast, the connected-part seal structure 1 in the present embodiment is configured such that the first and second outside pressure-contact allowances P3 and P4 are smaller than the first and second inside tapered pressure-contact allowances P1 and P2, and the pressure-contact forces F6 are smaller than the pressure-contact forces F5. Fluid leakage is mainly prevented by the sealing portions between the inner peripheral surfaces of the first and second annular protrusions 17 and 27 and the corresponding inner walls of the first and second annular grooves 31a and 31b. Accordingly, the first and second outside pressure-contact allowances P3 and P4 do not need to have a size nearly equal to the first and second inside tapered pressure-contact allowances P1 and P2. Specifically, the first and second outside pressure-contact allowances P3 and P4 can be reduced in size to a degree that can suppress deformation of the first and second outside annular walls 21m and 31n and maintain a predetermined sealing load F4.

According to the connected-part seal structure 1 in the present embodiment, in which the first and second outside pressure-contact allowances P3 and P4 are designed with a minimum size, the drawing load to draw together the first and second connected parts 11 and 21 against the elastic force of the seal body 31 is reduced. In other words, when the first and second connected parts 11 and 21 are drawn together by interposing the seal body 31, the repulsion force generated by the seal body 31 is reduced. Thus, the connected-part seal structure 1 in the present embodiment can prevent the first and second connection end faces 12 and 22 from deforming due to the repulsion force of the seal body 31 and lowering the sealing strength.

Since the first and second connection end faces 12 and 22 are suppressed from warping, the first and second connected parts 11 and 21 provide the distance W1 between the first clamp groove 13 and the second clamp groove 23 after the connection end faces 12 and 22 are drawn is nearly equal to the inner size W2 of the clamp member 40 as shown in FIG. 7. The connected-part seal structure 1 thus allows easy attachment of the clamp member 40 to the first and second connected parts 11 and 21 which will be coupled by interposing the seal body 31. Further, it is unnecessary to increase the strength of the clamp member 40 to suppress warping of the first and second connection end faces 12 and 22. Thus, the clamp member 40, and the first and second connected parts 11 and 21 can be designed with reduced thickness, so that the connected-part seal structure 1 can be provided in a compact size.

In addition, in the connected-part seal structure 1 in the present embodiment, the gaps S1 to S4 allow the first and second outside annular walls 31m and 31n to deform and the gaps S5 and S6 allow the first and second inside annular walls 31v and 31w to deform. This configuration can reduce the repulsion force generated by the seal body 31 when the first and second connected parts 11 and 21 are drawn together via the seal body 31 interposed therebetween. Since the repulsion force is reduced in this manner, the first and second connected parts 11 and 21 are suppressed from deforming the first and second connection end faces 12 and 22 when the connected parts 11 and 21 are coupled through the seal body 31. In this regard, similarly, the clamp member 40, and the first and second connected parts 11 and 21 can be designed with reduced thickness, so that the connected-part seal structure 1 is compact.

In the connected-part seal structure 1 in the present embodiment, the first and second outer tapered parts 14b and 24b and the first and second outer pressure-contact tapered parts 31p and 31q are slanted at a sharp angle with respect to the base end parts 17a and 27a of the first and second annular protrusions 17 and 27. Thus, the first and second annular walls 31m and 31n are allowed to easily tilt toward the base end parts 17a and 27a of the first and second annular protrusions 17 and 27. In the connected-part seal structure 1 in the present embodiment, therefore, the tilting generated at the first and second outside pressure-contact allowances P3 and P4 efficiently increases the sealing loads F4. Thus, even if the first and second outside pressure-contact allowances P3 and P4 are set smaller than the first and second inside tapered pressure-contact allowances P1 and P2, the sealing loads F3 and F4 are increased, thereby enabling reliable prevention of fluid leakage.

<Analysis of Surface Pressure>

Figure 9:
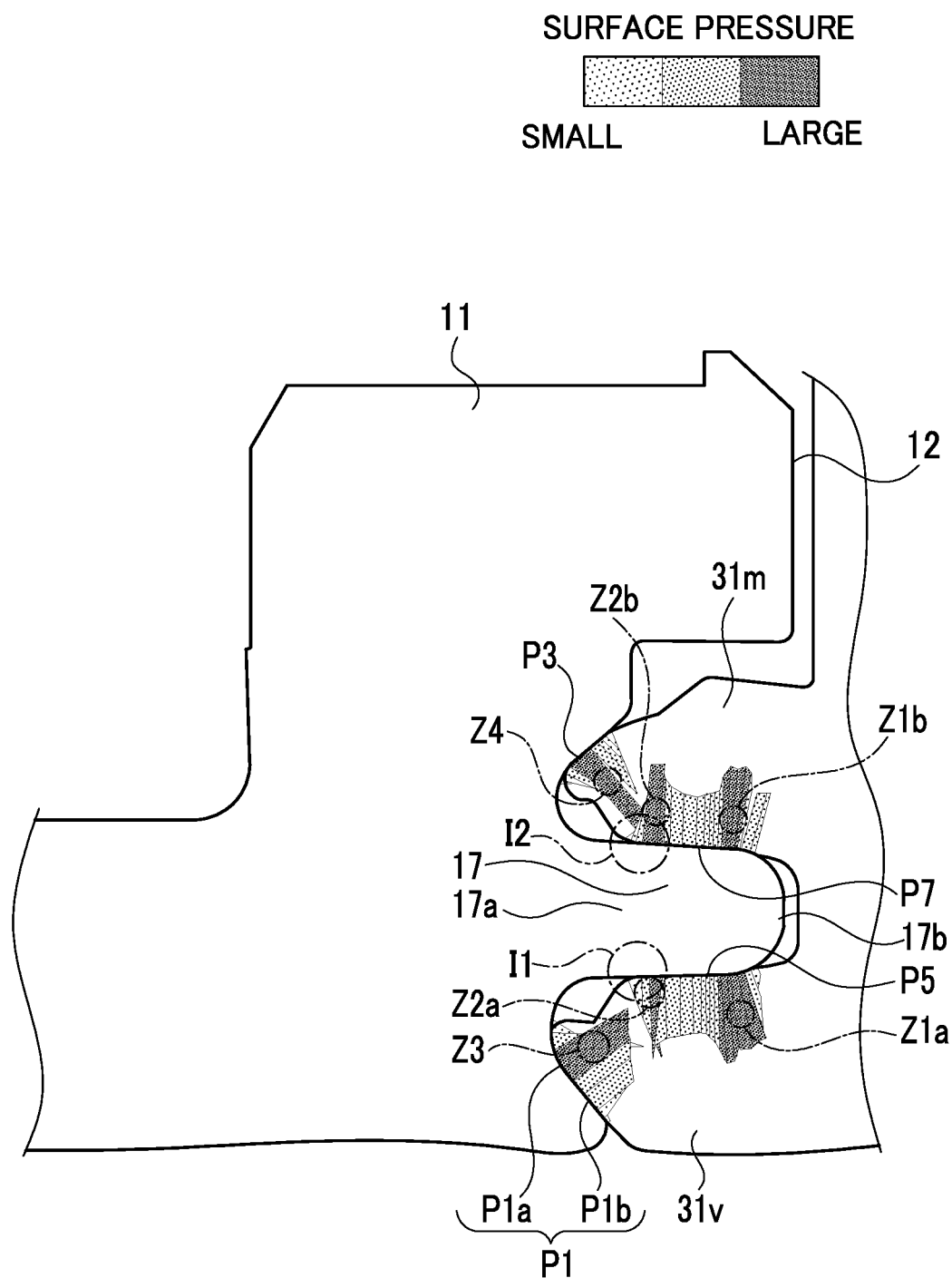
FIG. 9 is a diagram showing a surface contact analysis result of the connected-part seal structure shown in FIG. 1.

The present inventors made a simulation to analyze the surface pressures generated in the seal body 31 in the connected-part seal structure 1 in the present embodiment. Since the first and second connection end faces 12 and 22 of the first and second connected parts 11 and 21 have the same shape as each other and both end faces of the seal body 31 have the same shape as each other, the simulation was conducted on only one side, i.e., the first annular protrusion 17 of the first connection end face 12 and the first annular groove 31a of the seal body 31. This result of analysis of the surface pressures is plotted in FIG. 9. In FIG. 9, the orientation and the strength of the surface pressures are depicted in bar graph and the magnitude of the surface pressures is expressed in gradation. That is, bar graphs having longer length and darker gradation indicate higher surface pressures.

It is revealed that a high surface pressure Z3 occurs in the part P1a located on the leading end side of the first inside annular wall 31v of the first inside tapered pressure-contact allowance P1 as shown in FIG. 9. This surface pressure Z3 is generated toward a part 11 in the figure, near the junction between the first annular groove 31a and the first positioning part 31c. Accordingly, it is revealed that the surface pressure in the first inside seal pressure-contact allowance P5 increased near the junction between the first annular groove 31a and the first positioning part 31c. Such a locally generated high surface pressure provides effective sealing strength to prevent fluid leakage. This result shows that even if the part P1b located on an inner side than the leading end of the first inside annular wall 31v of the first inside tapered pressure-contact allowance P1 is designed smaller than the part P1a located on the leading end side to reduce warping of the first connected part 11, the sealing strength of the first inside seal pressure-contact allowance P5 can be highly maintained.

Furthermore, a surface pressure Z4 occurs in the first outside pressure-contact allowance P3 and is generated toward a part I2 in the drawing, near the junction between the first annular groove 31a and the first positioning part 31c. Accordingly, it is found that the surface pressure generated in the first outside seal pressure-contact allowance P7 has been increased near the junction between the first annular groove 31a and the first positioning part 31c. Moreover, the first inside seal pressure-contact allowance P5 and the first outside seal pressure-contact allowance P7 allow the leading end part of the first annular protrusion 17 to widen and press-fit into the first annular groove 31a, so that surface pressures Z1a and Z1b are locally generated. This causes high surface pressures at four sections in the first inside seal pressure-contact allowance P5 and the first outside seal pressure-contact allowance P7, each having such a high sealing power as to prevent fluid leakage.

The surface pressures Z1a and Z2a generated radially inward in the first inside seal pressure-contact allowance P5 are symmetric and nearly equal in magnitude to the surface pressures Z1b and Z2b generated radially outward in the first outside seal pressure-contact allowance P7. Furthermore, the surface pressure Z3 generated in the first inside tapered pressure-contact allowance P1 and the surface pressure Z4 generated in the first outside pressure-contact allowance P3 occur symmetrically and nearly equally in magnitude to each other and respectively extend toward the first inside seal pressure-contact allowance 5 and the first outside seal pressure-contact allowance P7. Specifically, the sealing power generated between each of the first and second connected parts 11 and 21 and the seal body 31 act with a good balance between a radially inward direction and a radially outward direction. In the connected-part seal structure 1, therefore, the part of the first connected part 11 to which the clamp member 40 is attached is less likely to deform, or warp, and can maintain the sealing strength at a constant or higher level.

Second Embodiment

Figure 10:
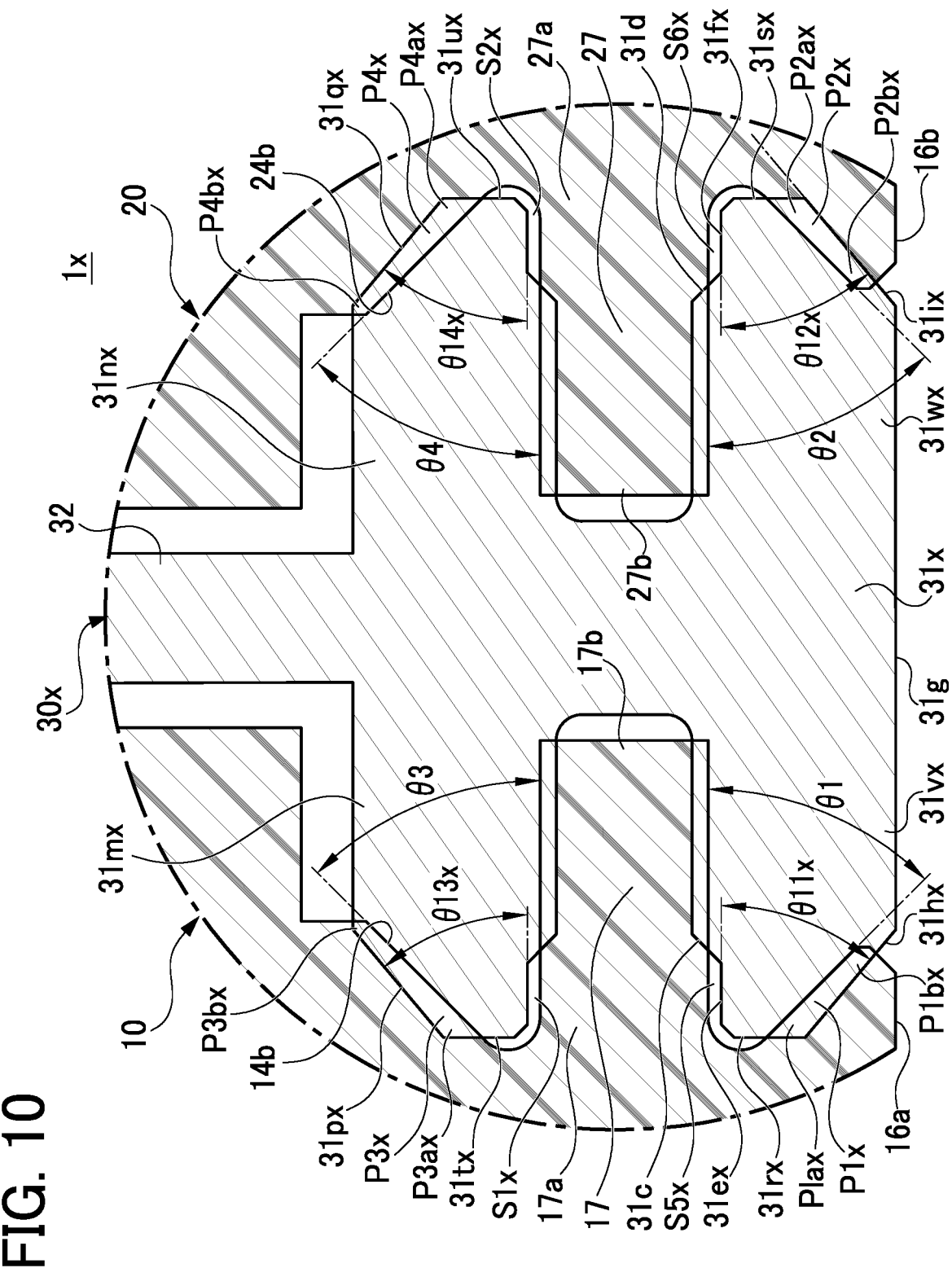
FIG. 10 is a cross-sectional view of a connected-part seal structure in a second embodiment of the present invention.
Figure 11:
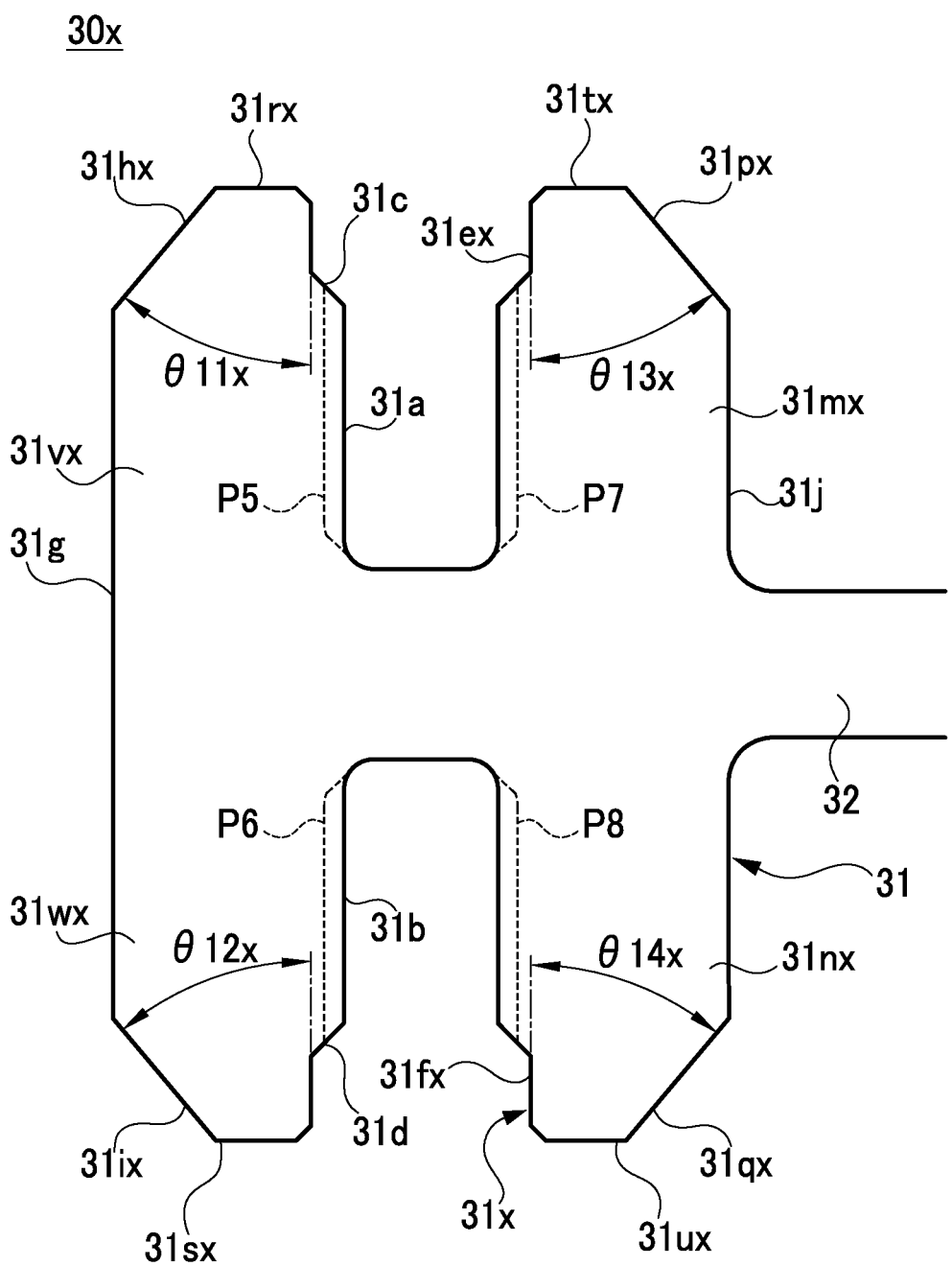
FIG. 11 is an enlarged cross-sectional view of a seal body and its surroundings of a seal ring in the second embodiment.

Next, a second embodiment of the present invention will be described below. FIG. 10 is a cross-sectional view of a connected-part seal structure 1x in the second embodiment of the present invention. FIG. 11 is an enlarged cross-sectional view of a seal body 31x and its surroundings in a seal ring 30x shown in FIG. 10. The first pipe 10, the second pipe 20, and the seal ring 30x are made of fluorine resin; however, FIG. 10 illustrates the seal ring 30x with hatching lines different from the hatching lines of the first pipe 10 and the second pipe 20 to facilitate visualization. In FIG. 11, they are depicted with only a cross-sectional profile without hatching lines.

<Outline Structure of Connected-Part Seal Structure>

The connected-part seal structure 1x in the second embodiment is configured as with that in the first embodiment excepting the seal body 31x of the seal ring 30. The present embodiment will be described with a focus on the seal body 31x. Similar or identical parts to those in the first embodiment are given the same reference signs in the drawings and the description as those in the first embodiment and they are not elaborated upon.

The seal body 31x shown in FIGS. 10 and 11 mainly differs from the seal body 31 in the first embodiment in that first and second inner pressure-contact tapered parts 31hx and 31ix are symmetrical to first and second outer pressure-contact tapered parts 31px and 31qx and first and second inside tapered pressure-contact allowances P1x and P2x are symmetrical to first and second outside pressure-contact allowances P3x and P4x about the first annular protrusion 17 or the second annular protrusion 27.

The first and second inner pressure-contact tapered parts 31hx and 31ix are provided with a slightly larger thickness in the radial direction than the first and second inner pressure-contact tapered parts 31h and 31i in the first embodiment. In other words, a leading end face 31rx of a first inside annular wall 31vx and a leading end face 31sx of a second inside annular wall 31wx are provided wider in the radial direction respectively than the leading end face 31r of the first inside annular wall 31v and the leading end face 31s of the second inside annular wall 31w in the first embodiment.

A taper angle θ11x of the first inner pressure-contact tapered part 31hx and the taper angle θ12x of the second inner pressure-contact tapered part 31ix are respectively set equal to the taper angle θ11 and the taper angle θ12 in the first embodiment. Therefore, the first and second inside tapered pressure-contact allowances P1x and P2x of the first and second inner pressure-contact tapered parts 31hx and 31ix are set larger in the parts P1ax and P2ax close to the leading end faces 31rx and 31sx than in the parts P1bx and P2bx far from the leading end faces 31rx and 31sx as shown in FIG. 10. In other words, the first and second inside tapered pressure-contact allowances P1x and P2x are larger as closer to the base end parts 17a and 27a.

The first and second outer pressure-contact tapered parts 31px and 31qx shown in FIGS. 10 and 11 are provided respectively at the taper angles θ13 and θ14 set smaller than the taper angles θ3 and θ4 of the first and second outer tapered parts 14b and 24b. Thus, the first and second outside pressure-contact allowances P3x and P4x of the first and second outer pressure-contact tapered parts 31px and 31qx are provided so that the parts P3ax and P4ax closer to the leading end faces 31tx and 31ux of the first and second outside annular walls 31mx and 31nx are larger than the parts P3bx and P4bx far from the leading end faces 31tx and 31ux of the first and second outside annular walls 31mx and 31nx. In other words, the first and second outside pressure-contact allowances P3x and P4x are larger as closer to the base end parts 17a and 27a.

The taper angles θ13x and θ14x of the first and second outer pressure-contact tapered parts 31px and 31qx are set respectively equal to the taper angles θ11x and θ12x of the first and second inner pressure-contact tapered parts 31hx and 31ix. Therefore, as shown in FIG. 10, the first and second outside pressure-contact allowances P3x and P4x of the first and second outer pressure-contact tapered parts 31px and 31qx are designed with a size nearly equal to the first and second inside tapered pressure-contact allowances P1x and P2x. The leading end faces 31rx and 31sx of the first and second inside annular walls 31vx and 31wx are respectively at the same level as the leading end faces 31tx and 31ux of the first and second outside annular walls 31mx and 31nx, so that no gap is formed between the first outer tapered part 14b and the first outer pressure-contact tapered part 31px and between the second outer tapered part 24b and the second outer pressure-contact tapered part 31qx.

As shown in FIG. 10, the first and second large-diameter parts 31ex and 31fx are designed with a width in the radial direction nearly equal to the width of the first and second annular protrusions 17 and 27 in the radial direction. Thus, gaps S1x, S2x, S5x, and S6x are respectively smaller than the gaps S1, S2, S5, and S6 in the first embodiment.

<Relationship of Forces in Connected-Part Seal Structure>

Figure 12:
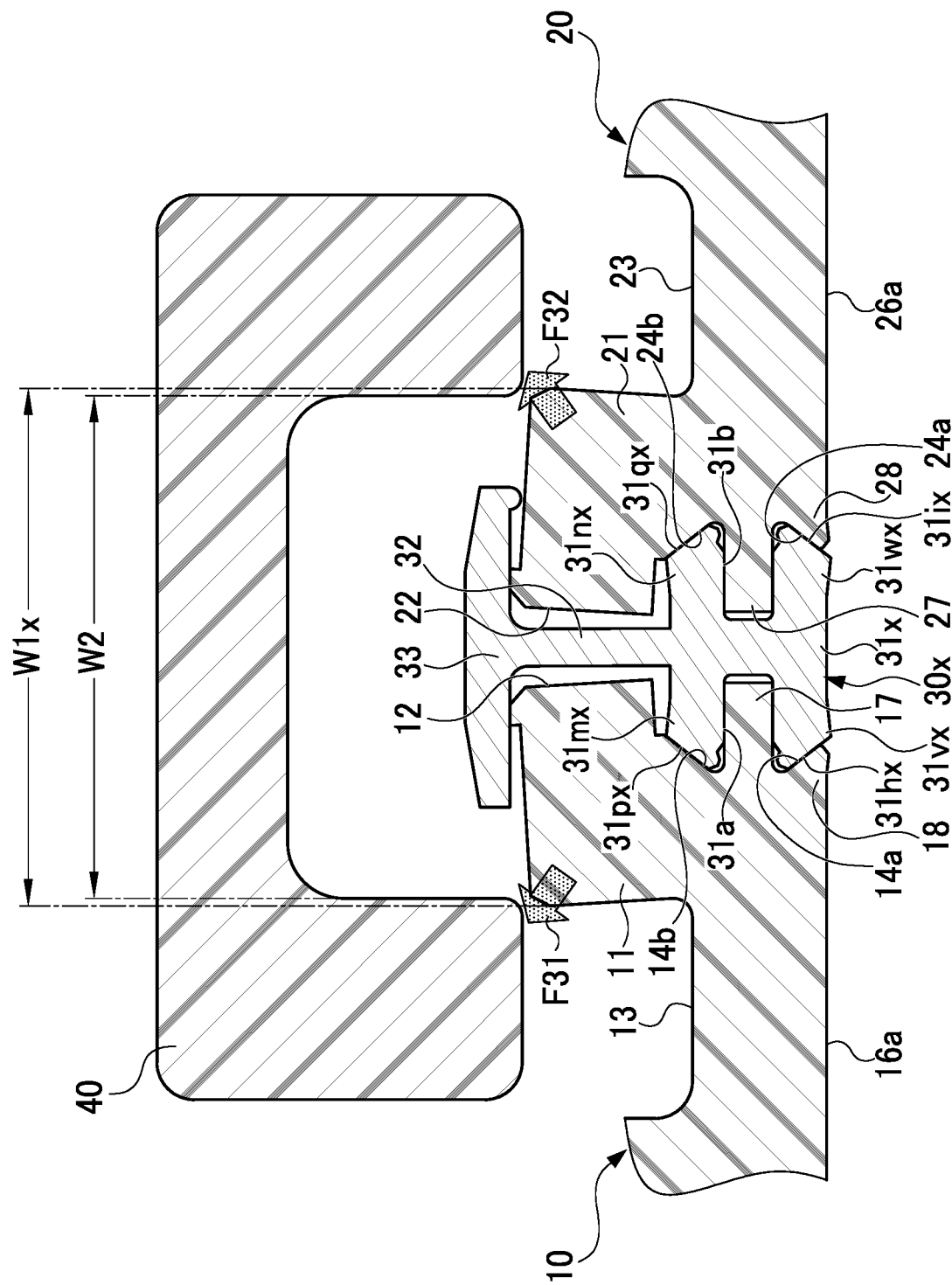
FIG. 12 is a view showing that an operation of press-fitting first and second annular protrusions in first and second annular grooves has been completed.
Figure 13:
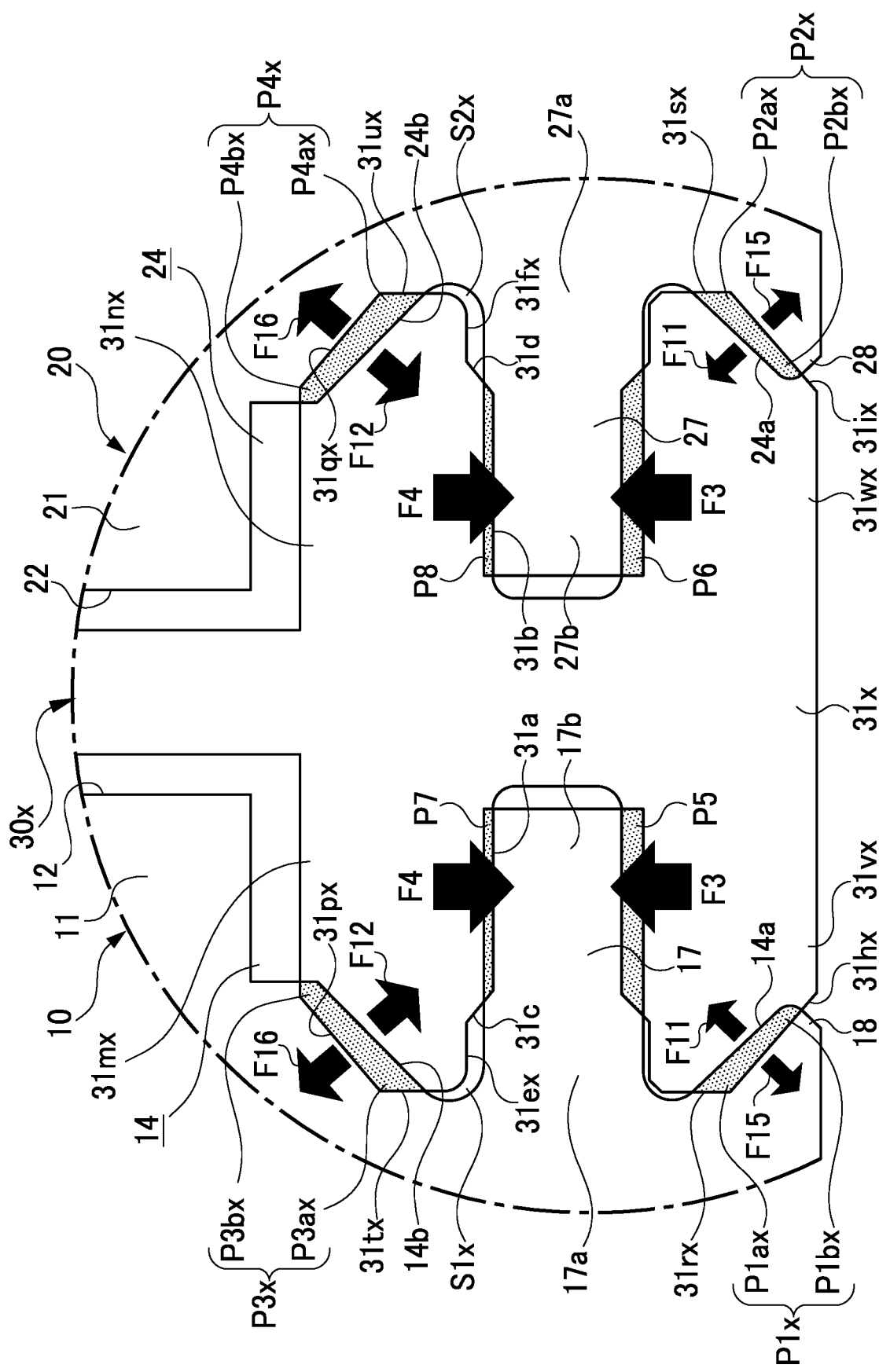
FIG. 13 is an explanatory view to show a relationship of strength in sealing portions in the connected-part seal structure shown in FIG. 10.

FIG. 12 shows that an operation of press-fitting the first and second annular protrusions 17 and 27 respectively into the first and second annular grooves 31a and 31b. FIG. 13 is an explanatory view to show a relationship of strength between the sealing portions in the connected-part seal structure 1x shown in FIG. 10. In FIG. 13, only a cross-sectional profile is depicted for easy visualization. In FIG. 12, as with FIG. 10, the seal ring 30x is illustrated with hatching lines different from hatching lines of the first pipe 10 and the second pipe 20.

As shown in FIG. 12, in the connected-part seal structure 1x in the present embodiment, when the first and second annular protrusions 17 and 27 are respectively press-fitted into the first and second annular grooves 31a and 31b, the first and second inner pressure-contact tapered parts 31hx and 31ix are pressed into contact with the first and second inner tapered parts 14a and 24a and the first and second outer pressure-contact tapered parts 31px and 31qx are pressed into contact with the first and second outer tapered parts 14b and 24b. Accordingly, in the seal body 31x, the first and second inside annular walls 31vx and 31wx and the first and second outside annular walls 31mx and 31nx are suppressed from deforming.

As shown in FIG. 13, the seal body 31x is configured such that the first and second inside tapered pressure-contact allowances P1x and P2x are larger as closer to the base end parts 17a and 27a of the first and second annular protrusions 17 and 27 and as they are closer to a thicker part of the first and second support portions 18 and 28 in the radial direction. Accordingly, the first and second inside tapered pressure-contact allowances P1x and P2x enhance the pressure-contact forces F15 at the strong parts of the first and second support portions 18 and 28. Accordingly, even if receiving the repulsion force of the seal body 31x, the first and second support portions 18 and 28 are less likely to deform, or narrow a flow passage, and can maintain the sealing strength.

The first and second outside pressure-contact allowances P3x and P4x are designed with a size nearly equal to the first and second inside tapered pressure-contact allowances P1x and P2x so that the pressure-contact forces F15 and the pressure-contact forces F16 act on the first and second connected parts 11 and 21 to the same degree. In the connected-part seal structure 1x, therefore, the surface pressure F12 is larger than the surface pressure F11, thereby likely causing deformation, or warp, of the first and second connection end faces 12 and 22 as shown in FIG. 12.

In the connected-part seal structure 1 in the present embodiment, however, the taper angles θ13x and θ14x are smaller than the taper angles θ3 and θ4. Accordingly, in the seal body 31x, the pressure-contact forces F16 of the first and second outside pressure-contact allowances P3x and P4x are larger as closer to the leading end of the first and second outside annular walls 31mx and 31nx which will most greatly deform. The portions with the larger pressure-contact force F16 correspond to the base end parts 17a and 27a of the first and second annular protrusions 17 and 27 and thus they are most strong portions of the first and second connected parts 11 and 21. Thus, the first and second connection end faces 12 and 22 of the first and second connected parts 11 and 21 are prevented from deforming. Accordingly, the deforming loads F31 and F32 that respectively deform the first and second connection end faces 12 and 22 are reduced as shown in FIG. 12. This can minimize the load of drawing together the first and second connected parts 11 and 21 so that the distance W1x between the first clamp groove 13 and the second clamp groove 23 coincides with the inner size W2 of the clamp member 40.

Further, each surface pressure F11 applied by the first and second inner tapered parts 14a and 24a to the first and second inner pressure-contact tapered parts 31hx and 31ix and each surface pressure F12 applied by the first and second outer tapered parts 14b and 24b to the first and second outer pressure-contact tapered parts 31px and 31qx act toward the first and second inside seal pressure-contact allowances P5 and P6 and the first and second outside seal pressure-contact allowances P7 and P8. Thus, the sealing loads F3 and F4 are increased near the junction between the first annular groove 31a and the first positioning part 31c and the junction between the second annular groove 31b and the second positioning part 31d. The connected-part seal structure 1x can therefore maintain or increase the sealing strength with the minimum pressure-contact forces F15 and F16.

<Analysis of Surface Pressure>

Figure 14:
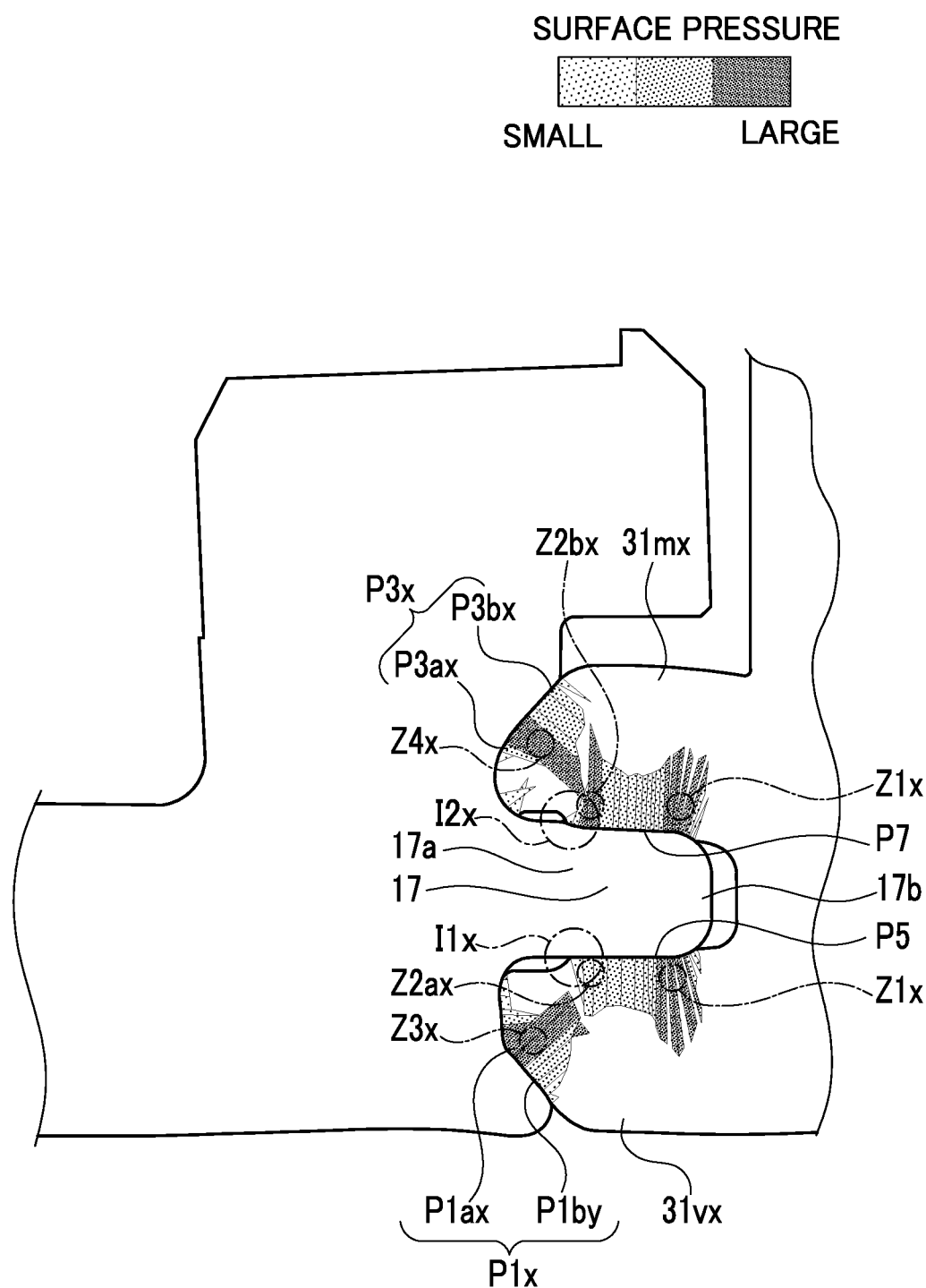
FIG. 14 is a diagram showing a surface contact analysis result of the connected-part seal structure shown in FIG. 10.

The present inventors made a simulation to analyze the surface pressures generated in the sealing portions in the connected-part seal structure 1x in the present embodiment. This simulation was similarly conducted on only one side, i.e., the first annular protrusion 17 of the first connection end face 12 and the first annular groove 31a of the seal body 31x. This result of analysis of the surface pressures is plotted in FIG. 14. In FIG. 14, the orientation and the strength of the surface pressures are depicted in bar graph and the magnitude of surface pressure is expressed in gradation. That is, bar graphs having longer length and darker gradation indicate higher surface pressures.

In the connected-part seal structure 1x, of the first inside tapered pressure-contact allowance P1x and the first outside pressure-contact allowance P3x, the parts P1ax and P3ax each located near the base end part 17a of the first annular protrusion 17 respectively receive high surface pressures Z3x and Z4x. These high surface pressures Z3x and Z4x are generated respectively toward the part I1x and I2x in the figure, near the junction between the first annular groove 31a and the first positioning part 31c. Accordingly, it is revealed that the surface pressure generated in the first inside seal pressure-contact allowance P5 increases. This result shows that even if the part P1bx located on the inner side than the leading end of the first inside annular wall 31vx of the first inside tapered pressure-contact allowance P1x is designed smaller than the part P1ax located on the leading end side to reduce warping of the first connected part 11, the sealing load F3 of the first inside seal pressure-contact allowance P5 can be maintained. It is further found that even if the first outside pressure-contact allowance P3x is nearly equal to the first inside tapered pressure-contact allowance P1x, the surface pressure Z4x is generated toward the first outside seal pressure-contact allowance P7. This indicates that when the taper angle θ13x is set smaller than the taper angle θ3 so that the first outside pressure-contact allowance P3x is larger as closer to the base end part 17a, the first connection end face 12 is prevented from deforming, or warping, and thus the lowering of the sealing strength can be reduced.

Third Embodiment

Figure 15:
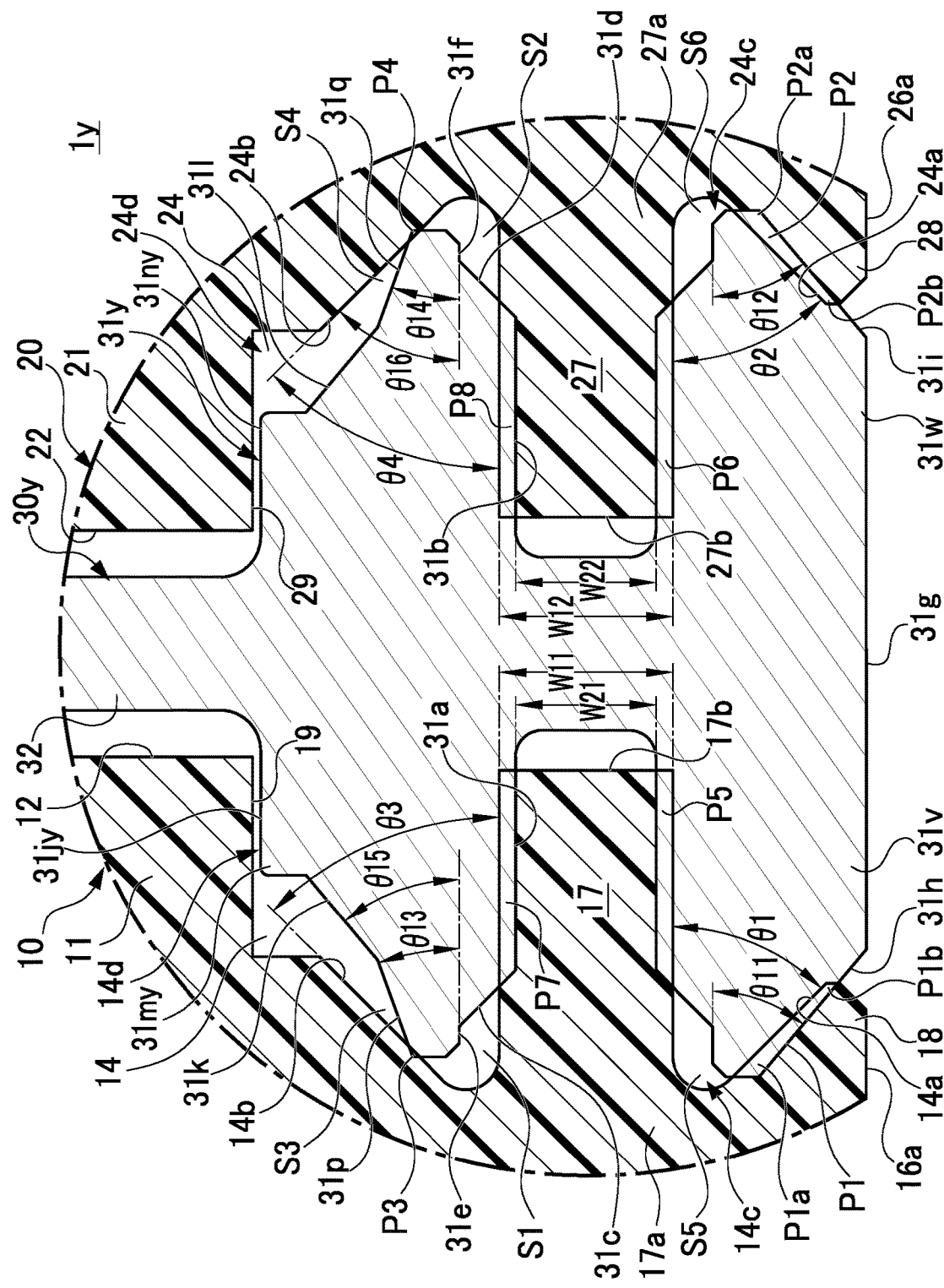
FIG. 15 is an enlarged cross-sectional view of a connected-part seal structure in a third embodiment of the present invention, showing a seal body and its surroundings.
Figure 16:
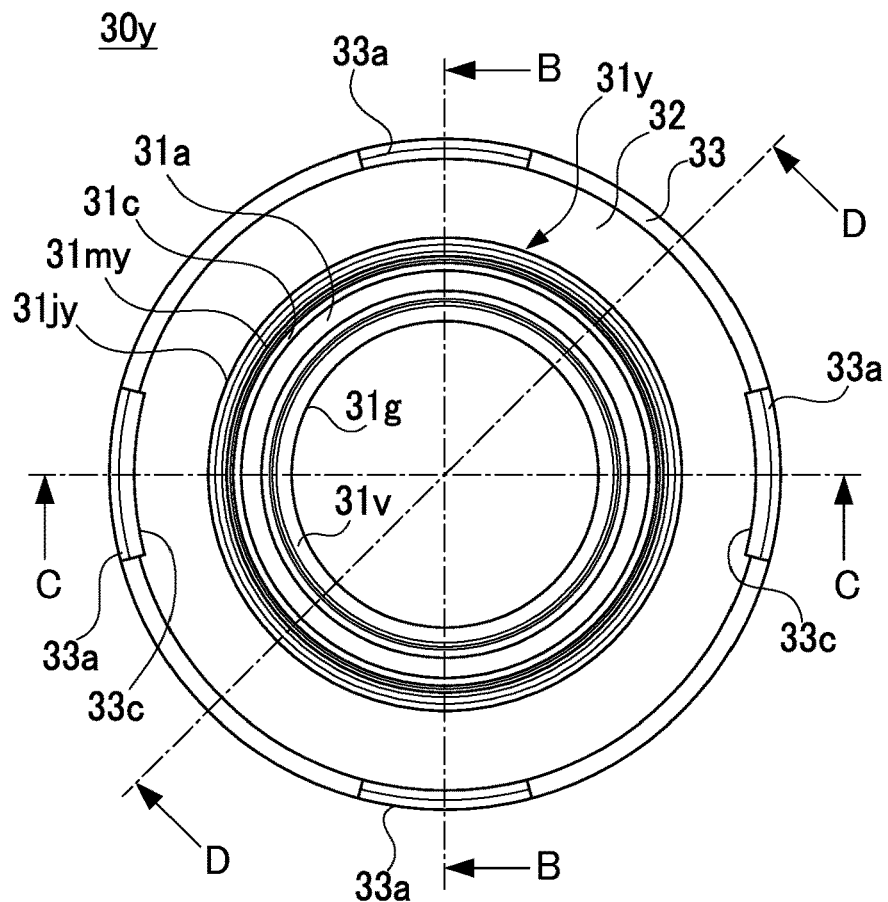
FIG. 16 is a front view of a seal ring in the third embodiment.
Figure 17:
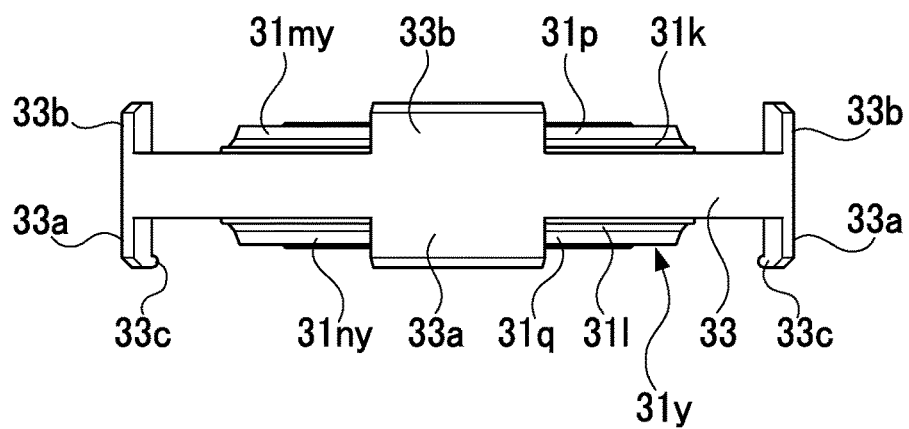
FIG. 17 is a top view of the seal ring in the third embodiment.
Figure 18:
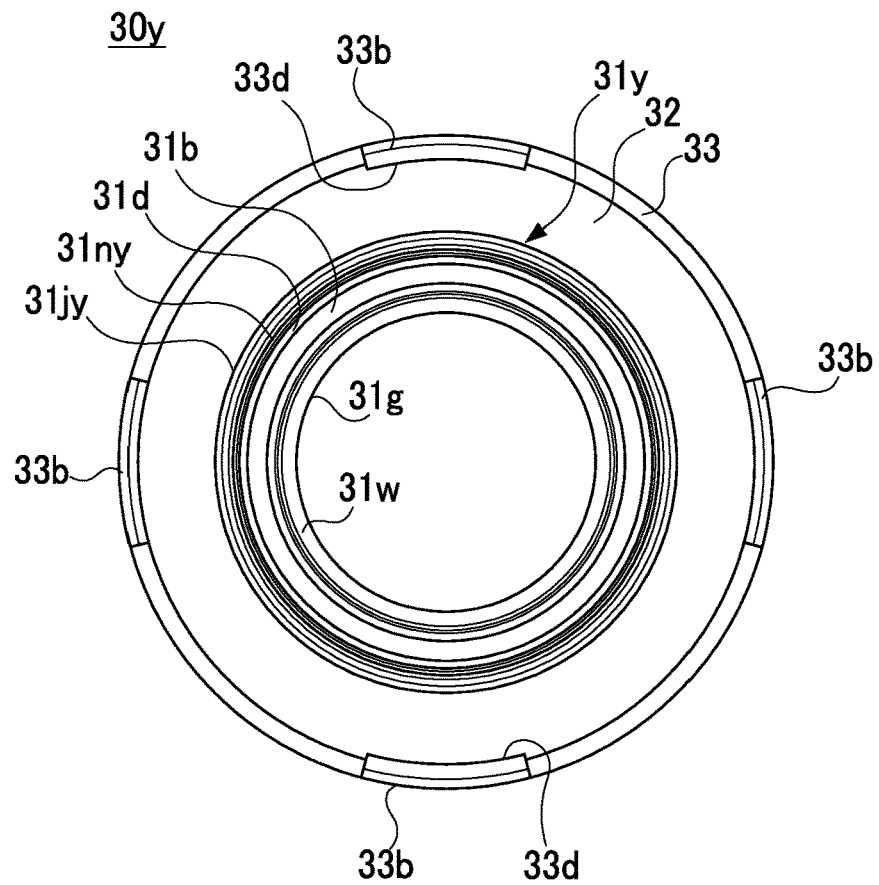
FIG. 18 is a back view of the seal ring in the third embodiment.
Figure 19:
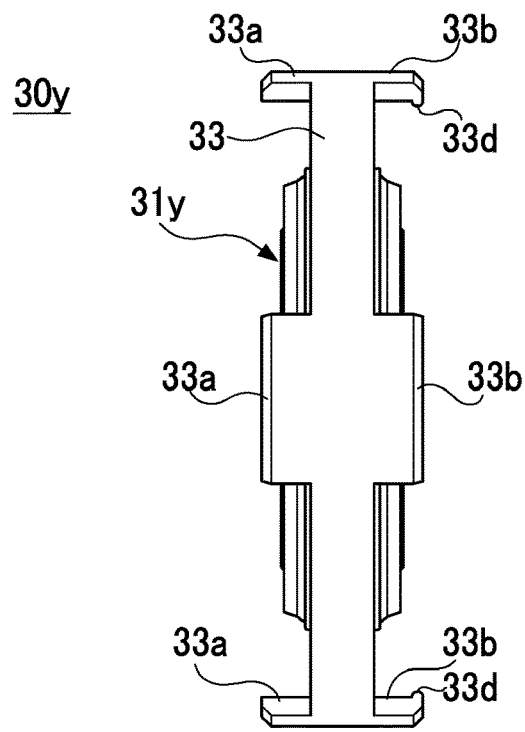
FIG. 19 is a right-side view of the seal ring in the third embodiment.
Figure 20:
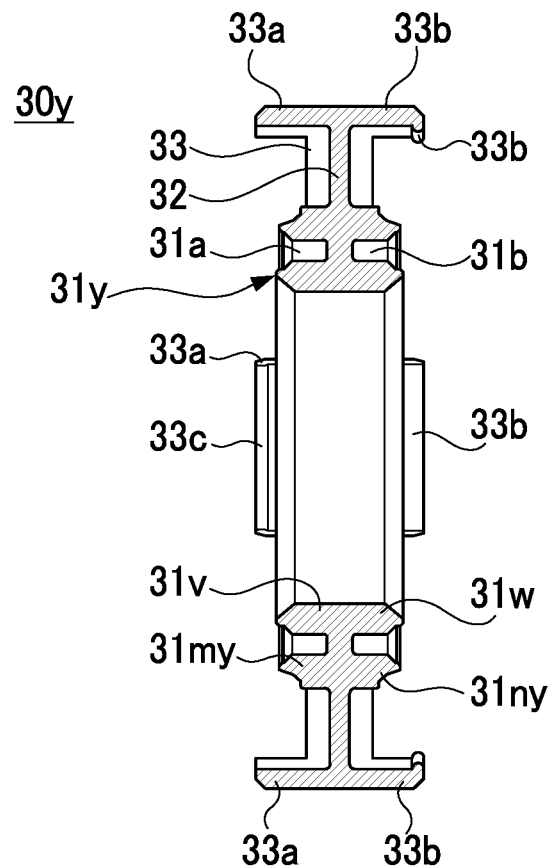
FIG. 20 is a B-B cross-sectional view of FIG. 16.
Figure 21:
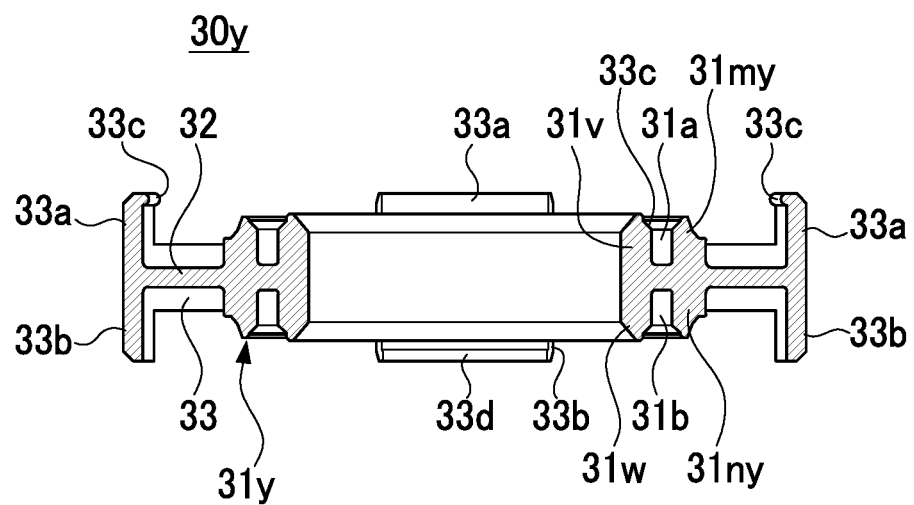
FIG. 21 is a C-C cross-sectional view of FIG. 16.
Figure 22:
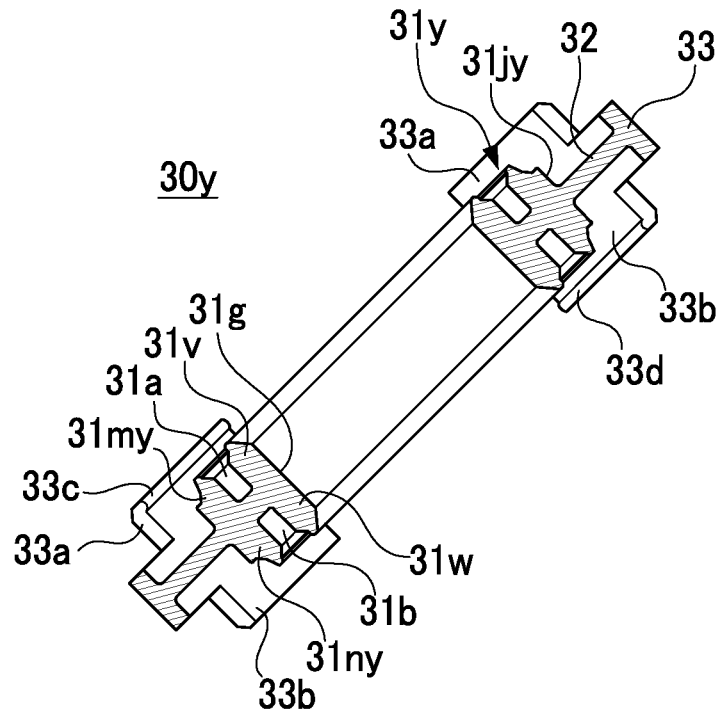
FIG. 22 is a D-D cross-sectional view of FIG. 16.
Figure 23:
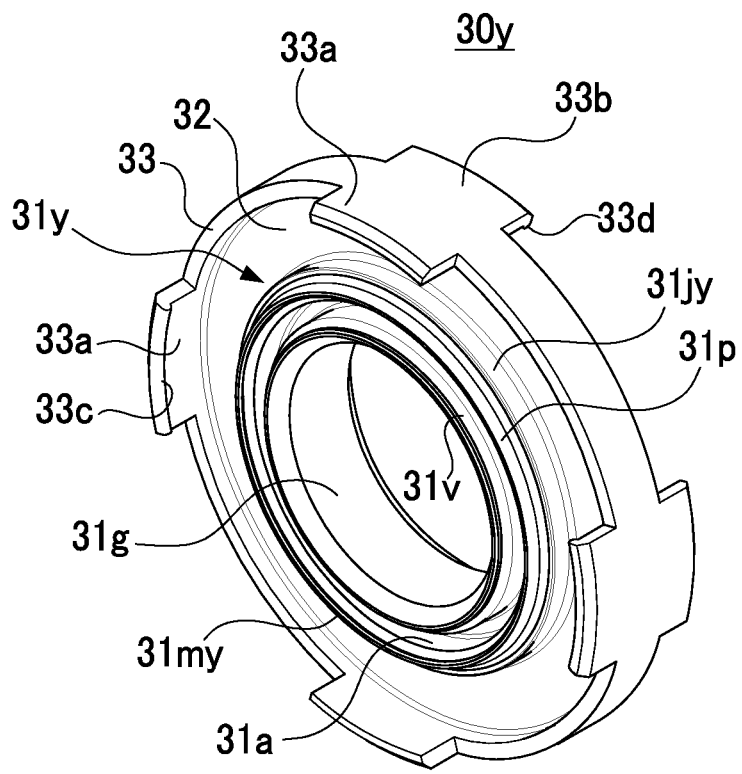
FIG. 23 is a front-side perspective view of a seal ring in the third embodiment.

Next, a third embodiment of the present invention will be described below. FIG. 15 is an enlarged cross-sectional view of a connected-part seal structure 1y, showing a seal body 31y and its surroundings, in the third embodiment of the present invention. FIG. 16 is a front view of a seal ring 30y. FIG. 17 is a top view of the seal ring 30y. FIG. 18 is a back view of the seal ring 30y. FIG. 19 is a right-side view of the seal ring 30y. FIG. 20 is a B-B cross-sectional view of FIG. 16. FIG. 21 is a C-C cross-sectional view of FIG. 16. FIG. 22 is a D-D cross-sectional view of FIG. 16. FIG. 23 is a front-side perspective view of the seal ring 30y. A bottom view of the seal ring 30y and a left-side view of the same are omitted because they appear symmetrically to the top view of FIG. 28 and the right-side view of FIG. 30, respectively. It will be understood that the first pipe 10, the second pipe 20, and the seal ring 30y are made of fluorine resin; however, FIGS. 15, 20, 21, and 22 illustrate the seal ring 30y with different hatching lines from the hatching lines of the first pipe 10 and the second pipe 20 to facilitate visualization.

<Outline Structure of Connected-Part Seal Structure>

The connected-part seal structure 1y in the third embodiment is configured as with that in the first embodiment excepting the seal body 31y. The present embodiment will be described with a focus on the seal body 31y. Similar or identical parts to those in the first embodiment are given the same reference signs in the drawings and the description as those in the first embodiment and they are not elaborated upon.

The seal body 31y shown in FIG. 15 differs from the seal body 31 in the first embodiment in that the wall surfaces 19 and 29, extending in the axial direction of the passage wall, of the first and second outer mounting grooves 14d and 24d are located close to the wall surfaces, extending in the axial direction of the passage wall, of the outer peripheral surfaces 31jy of the seal body 31y. Specifically, the seal body 31y is configured such that a first outside annular wall 31my and a second outside annular wall 31ny are thicker in radial thickness than the first outside annular wall 31m and the second outside annular wall 31n in the first embodiment.

<Relationship of Forces in Connected-Part Seal Structure>

In the connected-part seal structure $1y$ in the third embodiment, the wall surfaces 19 and 29 of the first and second outer mounting grooves $14d$ and $24d$ in the axial direction of the passage wall are located close to the wall surfaces of the outer peripheral surfaces $31jy$ of the seal body $31y$ in the axial direction of the passage wall. In other words, the inner diameter of each of the wall surfaces 19 and 29 is set slightly larger than the outer diameter of each of the first and second outside annular walls $31my$ and $31ny$ of the outer peripheral surface $31jy$. Accordingly, when the first and second annular protrusions 17 and 27 are press-fitted in the corresponding pressure-contact allowances P5 to P8 of the first and second annular grooves $31a$ and $31b$, the first and second outside annular walls $31my$ and $31ny$ are pressed radially outward by the first and second annular protrusions 17 and 27, making the outer peripheral surface $31jy$ come into contact with the wall surfaces 19 and 29. Thus, surface pressures are generated in contact portions between the first and second outside annular walls $31my$ and $31ny$ and the wall surfaces 19 and 29 to act toward the first and second annular protrusions 17 and 27. Accordingly, the first and second outside annular walls $31my$ and $31ny$ are respectively pushed toward the first and second annular protrusions 17 and 27.

For instance, when attachment and detachment of the first and second annular grooves $31a$ and $31b$ and the first and second annular protrusions 17 and 27 are excessively repeated or when the first and second connected parts 11 and 21 and the seal ring $30y$ are exposed to abnormal temperature changes, the pressure-contact forces F6 in the first and second outside pressure-contact allowances P3 and P4 may be decreased. In such a case, in the connected-part seal structure $1y$ in the present embodiment, the outer peripheral surface $31jy$ contacts with the wall surfaces 19 and 29, so that the first and second outside annular walls $31my$ and $31ny$ are sufficiently pushed toward the first and second annular protrusions 17 and 27 to prevent deformation of the seal body $31y$, thus enabling maintenance of the sealing loads F4 and the pressure-contact forces F6. According to the present embodiment, consequently, the sealing strength can be achieved as in an initial state or during temperature changes in a normal state.

The present invention is not limited to the foregoing embodiments and may be embodied in other specific forms without departing from the essential characteristics thereof.

For instance, the connected-part seal structure 1 may be applied to a configuration that the seal ring 30 is interposed between a drive part and a valve body in a valve.

For instance, the connected-part seal structure 1 may be applied to pipes and fluid control devices to be used in any devices different from a semiconductor manufacturing device.

Figure 24:
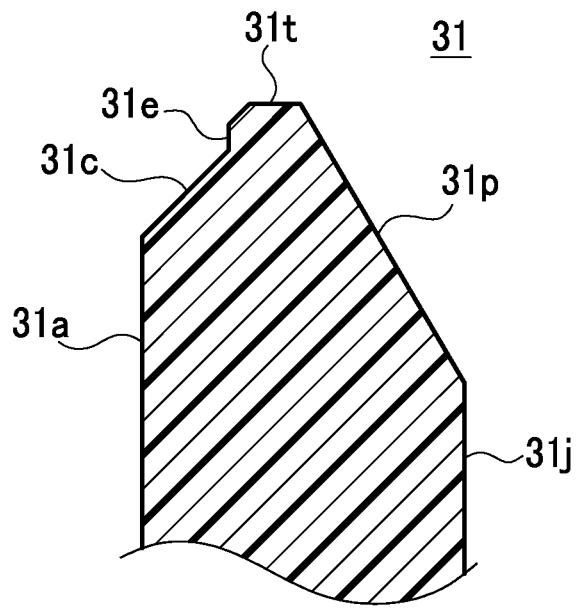
FIG. 24 is a first modified example of the seal body.

For example, the seal body 31 may be designed without the first and second large-diameter parts $31e$ and $31f$. Further, for example, the seal body 31 may be designed such that the first outer pressure-contact tapered part $31p$ is directly continuous with the outer peripheral surface $31j$ without interposing the first and second slant parts $31k$ and $31l$, as shown in FIG. 24.

For example, the first and second connected parts 11 and 21 may be made of PFA and the seal ring 30 may be made of PTFE. Furthermore, for example, the first and second connected parts 11 and 21 and the seal ring 30 may be made of the same material, such as PFA or PTFE.

For example, the first connection end face 12 of the first connected part 11 and the second connection end face 22 of the second connected part 21 may be different in shape from each other. The seal body 31 may be designed with both end faces having different shapes. For example, it may be arranged such that either the first connection end face 12 or the second connection end face 22 is provided with an inner tapered part, an outer tapered part, and others, and only one of the end faces of the seal body 31 is provided with an inner pressure-contact tapered part, an outer pressure-contact tapered part, and others.

Figure 25:
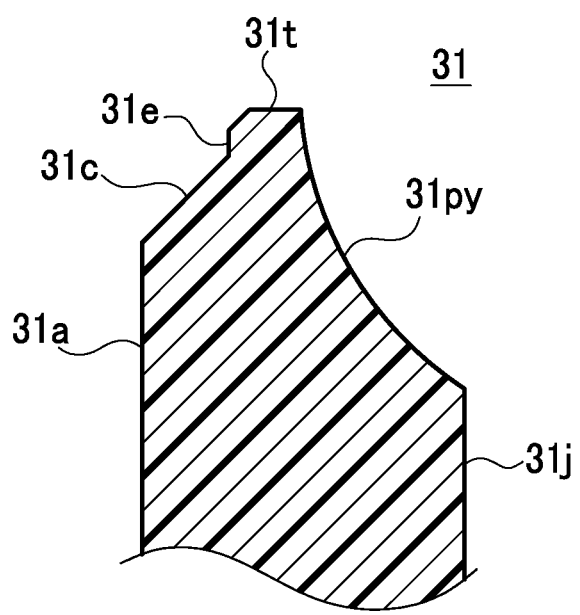
FIG. 25 is a second modified example of the seal body.
Figure 26:
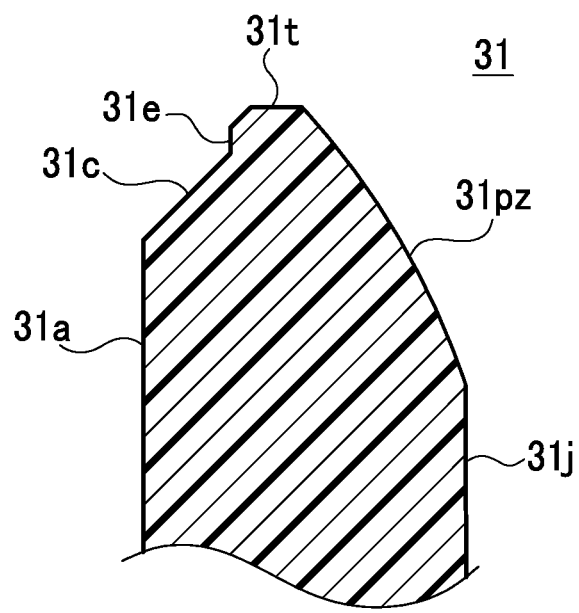
FIG. 26 is a third modified example of the seal body.

For example, the first outside pressure-contact allowances P3 and P3$x$ and the second outside pressure-contact allowances P4 and P4$x$ may each include a portion generated by distortion of the seal body 31 or $31x$ caused at the time of attachment. For example, as shown in FIG. 25, the seal body 31 may be provided with a first outer pressure-contact tapered part $31py$ having an arc-like cross-sectional shape recessed inward in the radial direction. As an alternative, for example, as shown in FIG. 26, the seal body 31 may be provided with a first outer pressure-contact tapered part $31pz$ having an arc-like cross-sectional shape protruded outward in the radial direction. In contrast to the above examples, it may be arranged for example such that the first outer pressure-contact tapered part of the seal body 31 is formed as a tapered surface, the first connected part 11 is provided with a first outer tapered part having an arc-like cross-sectional shape protruded or recessed at a position corresponding to the first outer pressure-contact tapered part. That is, according to the shape of the first outer tapered part, the outside pressure-contact allowance may be provided larger as closer to the base end part.

The taper angles θ1, θ2, θ3, and θ4 are larger than the taper angles θ11, θ12, θ13, θ14, θ11$x$, θ12$x$, θ13$x$, and θ14$x$. For example, the taper angles θ1, θ2, θ3, and θ4 may be set to 30° to 60° and the taper angles θ11, θ12, θ13, θ14, θ11$x$, θ12$x$, θ13$x$, and θ14$x$ may be set to 10° to 50°. The reason is as below. If the taper angle is too small, the wall thickness of each member is so thin as to cause poor strength. If the taper angle is too large, the surface pressure generated therein is directed in the axial direction of the first and second passage walls $16a$ and $26a$, not directed toward the first and second annular protrusions 17 and 27, and thus the sealing loads F3 and F4 are less likely to be maintained or enhanced.

Figure 27:
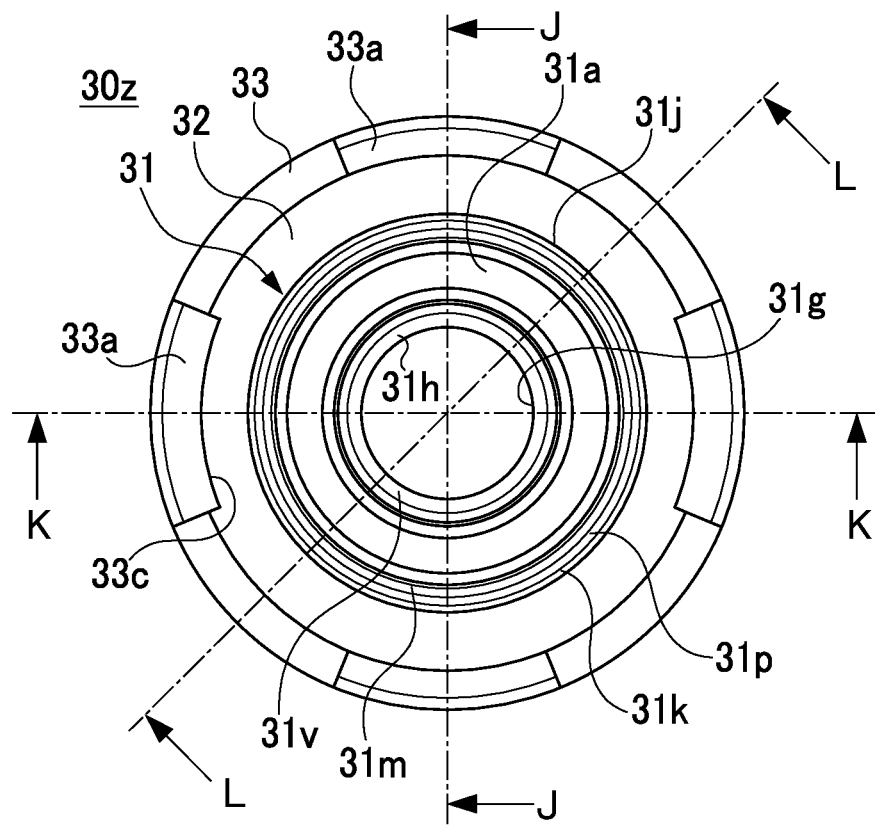
FIG. 27 is a front view of a seal ring in a modified example.
Figure 28:
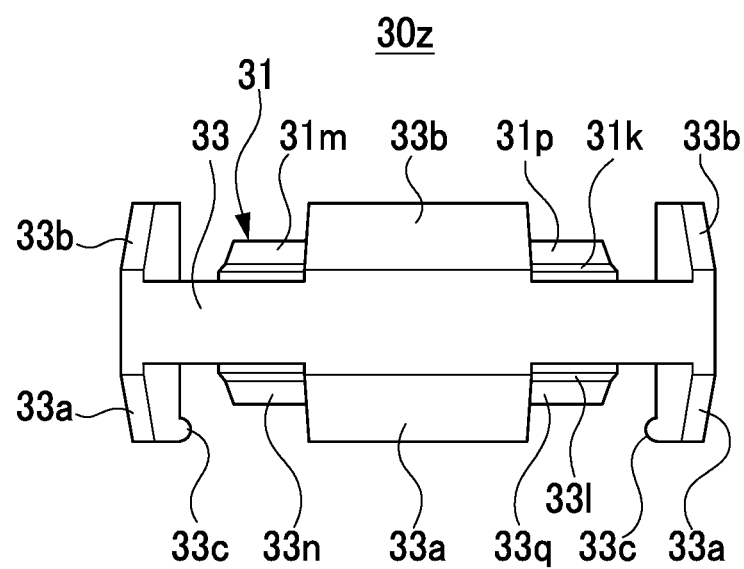
FIG. 28 is a top view of the seal ring shown in FIG. 27.
Figure 29:
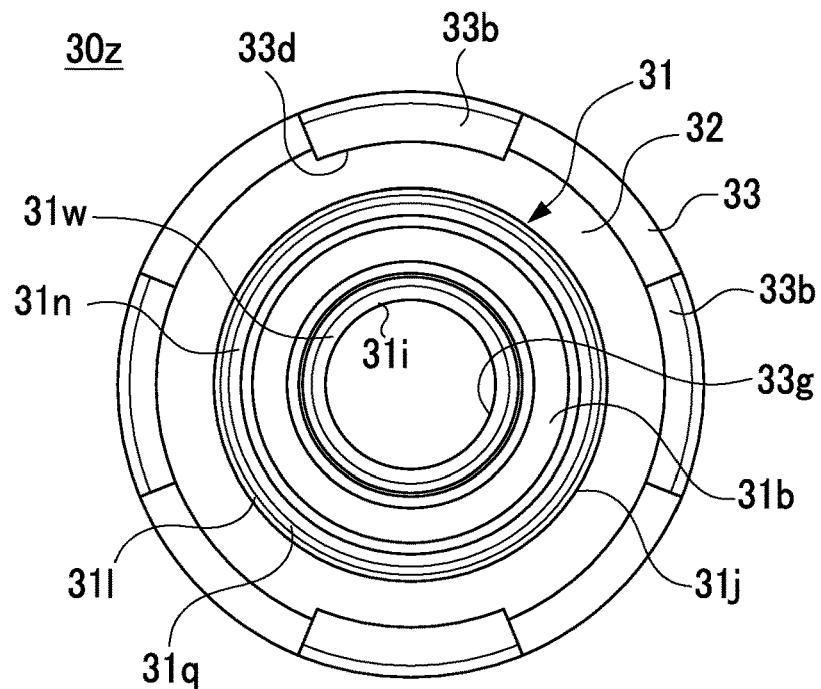
FIG. 29 is a back view of the seal ring shown in FIG. 27.
Figure 30:
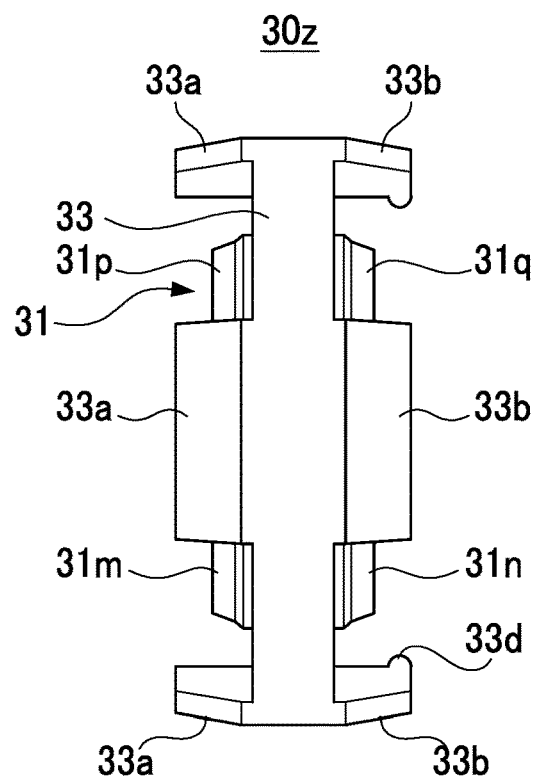
FIG. 30 is a right-side view of the seal ring shown in FIG. 27.
Figure 31:
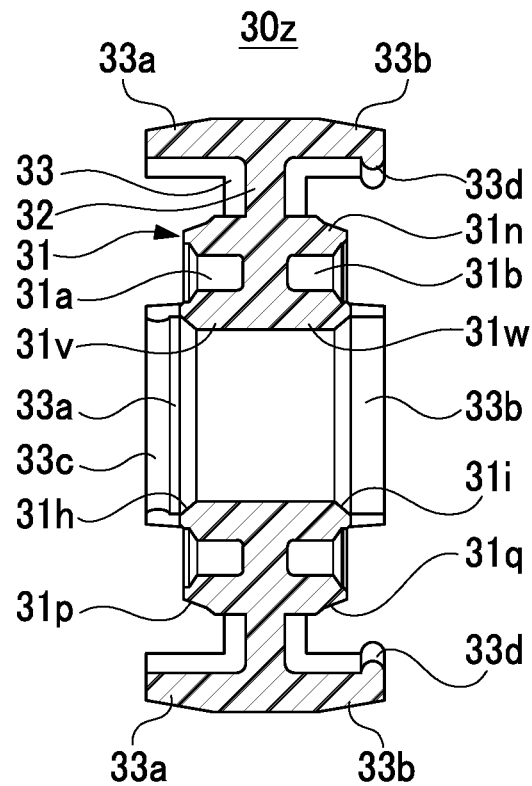
FIG. 31 is a J-J cross-sectional view in FIG. 27.
Figure 32:
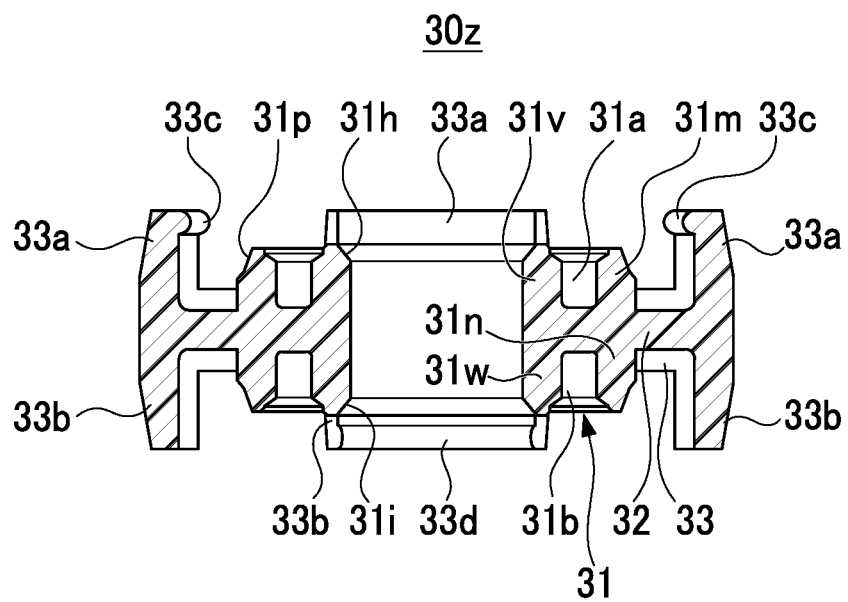
FIG. 32 is a K-K cross-sectional view in FIG. 27.
Figure 33:
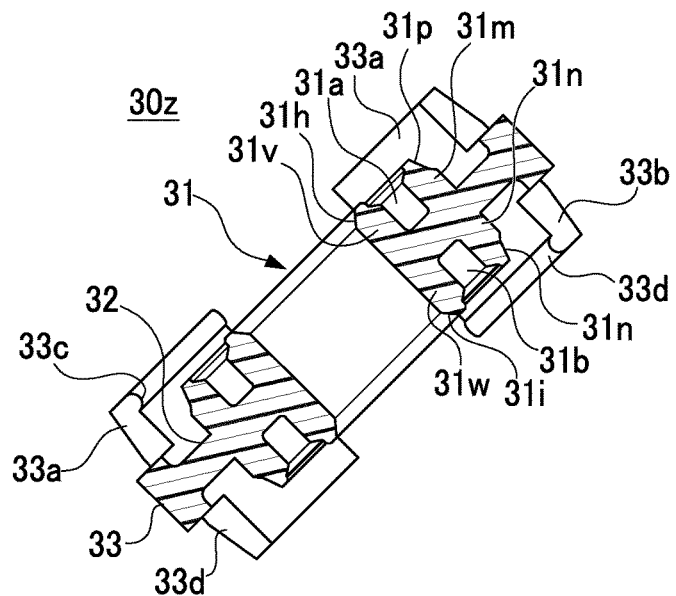
FIG. 33 is an L-L cross-sectional view in FIG. 27.
Figure 34:
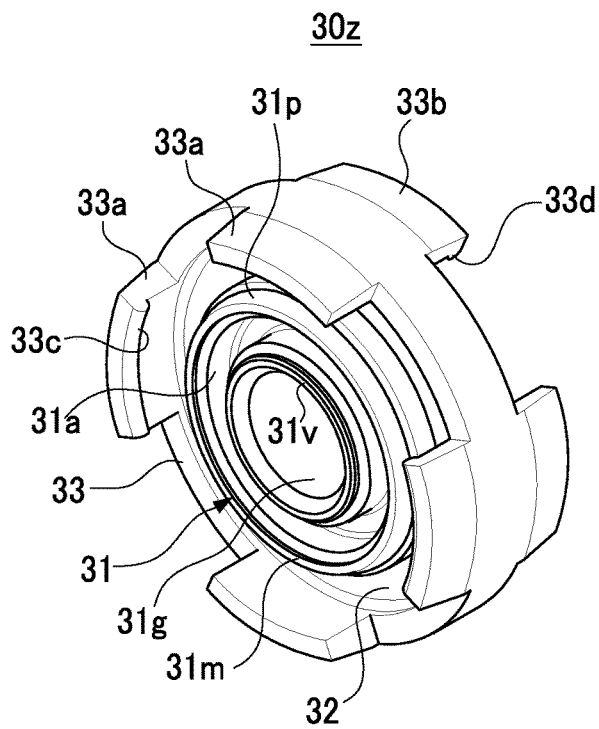
FIG. 34 is a front-side perspective view of the seal ring shown in FIG. 27.

For instance, needless to say, the seal rings 30, $30x$, and $30y$ in the foregoing embodiments may be designed such that the seal bodies 31, $31x$, and $31y$, the web part 32, and the retaining part 33 each can be appropriately changed in thickness, size in the radial direction, and others. For example, the seal ring 30 may be changed in thickness, size in the radial direction, and others as with a seal ring $30z$ shown in FIGS. 27 to 34. FIG. 27 is a front view of the seal ring $30z$, FIG. 29 is a back view of the seal ring $30z$, FIG. 28 is a top view of the seal ring $30z$, and FIG. 30 is a right-side view of the seal ring $30z$. FIG. 31 is a J-J cross-sectional view of FIG. 27, FIG. 32 is a K-K cross-sectional view of FIG. 27, and FIG. 33 is an L-L cross-sectional view of FIG. 27. FIG. 34 is a front-side perspective view of the seal ring $30z$. A bottom view of the seal ring $30z$ and a left-side view of the same are omitted because they appear symmetrically to the top view of FIG. 28 and the right-side view of FIG. 30, respectively.

In the foregoing embodiments and the modified examples shown in FIGS. 27 to 34, for example, the web part 32 and the retaining part 33 are integrally provided in the seal body 31, $31x$, or $31y$. As an alternative, the web part 32 and the retaining part 33 may not be elaborated upon. In other words, each of the seal rings 30, 30x, 30y, and 30z may be designed without the web part 32 and the retaining part 33. As an alternative, for example, each of the seal rings 30, 30x, 30y, and 30z may be designed without the retaining part 33.

REFERENCE SIGNS LIST 1, 1x, 1y Connected-part seal structure
11, 21 First and second connected part
12, 22 First and second connection end face
14, 24 First and second mounting groove
14a, 24a First and second inner tapered part
14b, 25b First and second outer tapered part
16, 26 First and second flow passage
16a, 26a First and second passage wall
16ax, 26ax Open end
17, 27 First and second annular protrusion
30 Seal ring
31, 31x, 31y Seal body
31a, 31b First and second annular groove
31h, 31i First and second inner pressure-contact tapered part
31p, 31q First and second outer pressure-contact tapered part
P1, P2, P1x, P2x First and second inside tapered pressure-contact allowance
P3, P4, P3x, P4x First and second outside pressure-contact allowance
θ1 to θ4, θ11 to θ14, θ11x to θ14x Taper angle

The invention claimed is:

1. A connected-part seal structure configured to couple a first connected part and a second connected part through a seal member, wherein both or one of a connection end face of the first connected part and a connection end face of the second connected part includes:
a passage wall including an open end that opens in the connection end face;
an annular protrusion provided outside in a radial direction of the passage wall and annularly extending along an outer periphery of the open end of the passage wall, the annular protrusion protruding in an axial direction of the passage wall;
a support portion for supporting an end of an inner peripheral surface of the seal member, the support portion being defined by the inner tapered part to annularly extend along the passage wall, wherein the support portion is thicker in wall thickness at a position closer to the base end part of the annular protrusion than in wall thickness at a position closer to a leading end part of the annular protrusion; and
an inner mounting groove provided inside the annular protrusion in a radial direction, and
the seal member has an annular shape and includes an annular groove in both or one of end faces, in which the annular protrusion is press-fitted,
wherein the inner mounting groove includes an inner tapered part provided inside a base end part of the annular protrusion in the radial direction,
the seal member includes an inner peripheral surface including an inner pressure-contact tapered part formed along an end portion positioned close to the end face in which the annular groove opens, the inner pressure-contact tapered part pressure-contacts with the inner tapered part, and
an inside tapered pressure-contact allowance is provided to allow the inner pressure-contact tapered part to pressure-contact with the inner tapered part and is larger at a position closer to the base end part of the annular protrusion than at a position closer to the leading end part of the annular protrusion.

2. The connected-part seal structure according to claim 1, wherein
the connection end face provided with the inner mounting groove includes an outer mounting groove located outside the annular protrusion in the radial direction,
the seal member includes an outside pressure-contact allowance which pressure-contacts with an inner wall of the outer mounting groove outward in a radial direction, and
the outside pressure-contact allowance is smaller than an inside tapered pressure-contact allowance which allows the inner pressure-contact tapered part to pressure-contact with the inner tapered part.

3. The connected-part seal structure according to claim 2, wherein the outside pressure-contact allowance is located at a position closer to the base end part of the annular protrusion relative to a seal pressure-contact allowance which allows an inner wall of the annular groove to pressure-contact with the annular protrusion.

4. The connected-part seal structure according to claim 3, wherein the outer mounting groove includes an outer tapered part provided outside the base end part of the annular protrusion in the radial direction.

5. The connected-part seal structure according to claim 4, wherein the seal member includes an outer peripheral surface including an outer pressure-contact tapered part formed along the end portion positioned close to the end face in which the annular groove opens.

6. The connected-part seal structure according to claim 4, wherein the seal member includes an outer peripheral surface located outside in the radial direction, the outer peripheral surface including a surface placed near a surface of the mounting groove in the axial direction.

7. The connected-part seal structure according to claim 3, wherein the seal member includes an outer peripheral surface including an outer pressure-contact tapered part formed along the end portion positioned close to the end face in which the annular groove opens.

8. The connected-part seal structure according to claim 7, wherein the seal member includes an outer peripheral surface located outside in the radial direction, the outer peripheral surface including a surface placed near a surface of the mounting groove in the axial direction.

9. The connected-part seal structure according to claim 3, wherein the seal member includes an outer peripheral surface located outside in the radial direction, the outer peripheral surface including a surface placed near a surface of the mounting groove in the axial direction.

10. The connected-part seal structure according to claim 1, further including a clamp member configured to fix the first connected part and the second connected part between which the seal member is interposed,
wherein the first connected part and the second connected part each have a flange shape formed with a clamp groove in which the clamp member is mounted,
the connection end face of the first connected part and the connection end face of the second connected part have the same shape as each other, and
the both end faces of the seal member have the same shape as each other.

11. The connected-part seal structure according to claim 2, wherein the outer mounting groove includes an outer tapered part provided outside the base end part of the annular protrusion in the radial direction.

12. The connected-part seal structure according to claim 11, wherein the seal member includes an outer peripheral surface including an outer pressure-contact tapered part formed along the end portion positioned close to the end face in which the annular groove opens.

13. The connected-part seal structure according to claim 11, wherein the seal member includes an outer peripheral surface located outside in the radial direction, the outer peripheral surface including a surface placed near a surface of the mounting groove in the axial direction.

14. The connected-part seal structure according to claim 2, wherein the seal member includes an outer peripheral surface including an outer pressure-contact tapered part formed along the end portion positioned close to the end face in which the annular groove opens.

15. The connected-part seal structure according to claim 14, wherein the seal member includes an outer peripheral surface located outside in the radial direction, the outer peripheral surface including a surface placed near a surface of the mounting groove in the axial direction.

16. The connected-part seal structure according to claim 2, wherein the seal member includes an outer peripheral surface located outside in the radial direction, the outer peripheral surface including a surface placed near a surface of the mounting groove in the axial direction.

17. The connected-part seal structure according to claim 2, further including a clamp member configured to fix the first connected part and the second connected part between which the seal member is interposed,
    wherein the first connected part and the second connected part each have a flange shape formed with a clamp groove in which the clamp member is mounted,
    the connection end face of the first connected part and the connection end face of the second connected part have the same shape as each other, and
    the both end faces of the seal member have the same shape as each other.

18. The connected-part seal structure according to claim 1, wherein the seal member is configured to form an annular gap between the base end part of the annular protrusion when the annular protrusion is press-fitted in the annular groove.

19. A seal member to be used in the connected-part seal structure according to claim 1.

20. A seal member to be used in the connected-part seal structure according to claim 2.

* * * * *